United States Patent [19]

Sakamoto

[11] Patent Number: 5,204,758
[45] Date of Patent: Apr. 20, 1993

[54] FACSIMILE SYSTEM HAVING MULTIPLE MOUNTING PORTIONS

[75] Inventor: Takahiro Sakamoto, Tokyo, Japan

[73] Assignee: Canon Kabushiki Kaisha, Tokyo, Japan

[21] Appl. No.: 644,443

[22] Filed: Jan. 22, 1991

[30] Foreign Application Priority Data

| Jan. 25, 1990 | [JP] | Japan | 2-16810 |
| Jan. 30, 1990 | [JP] | Japan | 2-19735 |
| Jan. 31, 1990 | [JP] | Japan | 2-20728 |
| Jan. 31, 1990 | [JP] | Japan | 2-20729 |
| Jan. 31, 1990 | [JP] | Japan | 2-20730 |
| Feb. 2, 1990 | [JP] | Japan | 2-23788 |
| Feb. 5, 1990 | [JP] | Japan | 2-25490 |

[51] Int. Cl.$^5$ .............................................. H04N 1/40
[52] U.S. Cl. ...................................... 358/444; 358/468
[58] Field of Search ........ 358/444, 468, 440, 403–404, 358/406

[56] References Cited

U.S. PATENT DOCUMENTS 4,943,868  7/1990  Yoshinaga et al. ................. 358/444
5,072,310  12/1991  Yamamoto et al. ................. 358/444

Primary Examiner—Stephen Brinich
Attorney, Agent, or Firm—Fitzpatrick, Cella, Harper & Scinto

[57] ABSTRACT

A plurality of mounting portions on which data memory cards having data input keys may be mounted freely detachably is provided. Each mounting portion has an opening for operating keys on a card. The priority order for communicating cards mounted in the mounting portions is pre-determined. According to the priority order, the data memory cards are communicated with the main unit.

10 Claims, 20 Drawing Sheets

FACSIMILE SYSTEM HAVING MULTIPLE MOUNTING PORTIONS

BACKGROUND OF THE INVENTION

1. Field of the Invention

The present invention relates to a facsimile system having a mounting portion on which an electronic telephone directory card or other data memory card is freely detachably mounted.

2. Related Background Art

Facsimile systems have various advanced functions recently and are getting more and more multifunctional. With the advent of the advanced and multifunctional facsimile system, it becomes possible to register destinations or addressees in abbreviated dial sets, and thereof the number of operation input switches on the operator panel is tend to increase. The increase in the number of switches causes such a problem that individual switches are made too compact and thereby the operability is deteriorated.

In a system disclosed, for example, in FIG. 1 of Pat. application Ser. No. 468869 filed in Jan. 23, 1990, one operation input switch contains multiple input functions and selects any input function.

In compliance with the multifunctional move, an IC ROM card is installed to further multiply the functions of a facsimile system. The ROM card is used with its end connected to a connector of the facsimile system, thus increasing memory capacity of a main unit of the facsimile system.

However, if one facsimile system is shared among multiple users, the users' facsimile receiving stations differ from person to person. In the aforesaid prior system, the number of registrable abbreviated dial sets and the memory capacity are limited. Therefore, all of the multiple users cannot register their intended company names in memory of the main unit of a facsimile system.

To solve these problems, proposed in U.S. Pat. application Ser. No. 539344 filed on Jun. 18, 1990 is a facsimile system having a mounting portion on which an electronic telephone directory card or other data memory card having data input keys is freely detachably mounted or attached. Therein, the mounted data memory card can be operated externally. In this proposal, the mounting portion for mounting a card comprises a recess 31 in the main unit of the facsimile system and has the size of the data memory card as shown in FIG. 24. Card is inserted into the recess 31 from above or sideways, and then shifted laterally with springs to be positioned properly.

A card thus mounted works to communicate data with the main unit of a facsimile system. Information specified by operating keys on the card is sent as optical information from light emitting element on the back of the card into light receiving element in the main unit of the facsimile system.

However, in the foregoing facsimile system, a card is placed on the bottom of the recess 31 in the mounting portion and then positioned. Therefore, the card must be arranged not to cause a gap between the card and the bottom of the recess 31. If a gap is created between the card and facsimile system, light emitting elements on the back of the card and light receiving elements in the main unit of the facsimile system are positioned incorrectly. Due to insufficient light or incident external light, the light receiving elements may receive incorrect optical information.

To solve these problems, an earlier application filed Dec. 27, 1990 has proposed a facsimile system which assures a close contact between a card and a mounting portion of the main unit.

The facsimile system shown in FIG. 24 has a single recess 31 in the card mounting portion. If multiple data memory cards are used, it is required to find a place for storing cards excepts the one mounted. These cards may be missing because no specific place is prepared as a storage. A data memory card or an electronic telephone directory cam communicate with a facsimile system and make a call via the facsimile system. Individual users may possess own data memory cards. Since the facsimile system has only a single card mounting portion, some place must be reserved to store the data memory cards.

SUMMARY OF THE INVENTION

The object of the present invention is to solve the aforesaid problems, thus neatly storing multiple cards which act as electronic telephone directories.

Other object of the invention is to prevent an incorrect operation even when multiple mounting portions are provided, wherein the priorities of cards are predetermined.

The other objects of the invention will be apparent in conjunction with embodiments described later.

DESCRIPTION OF THE PREFERRED EMBODIMENTS

Figure 1:
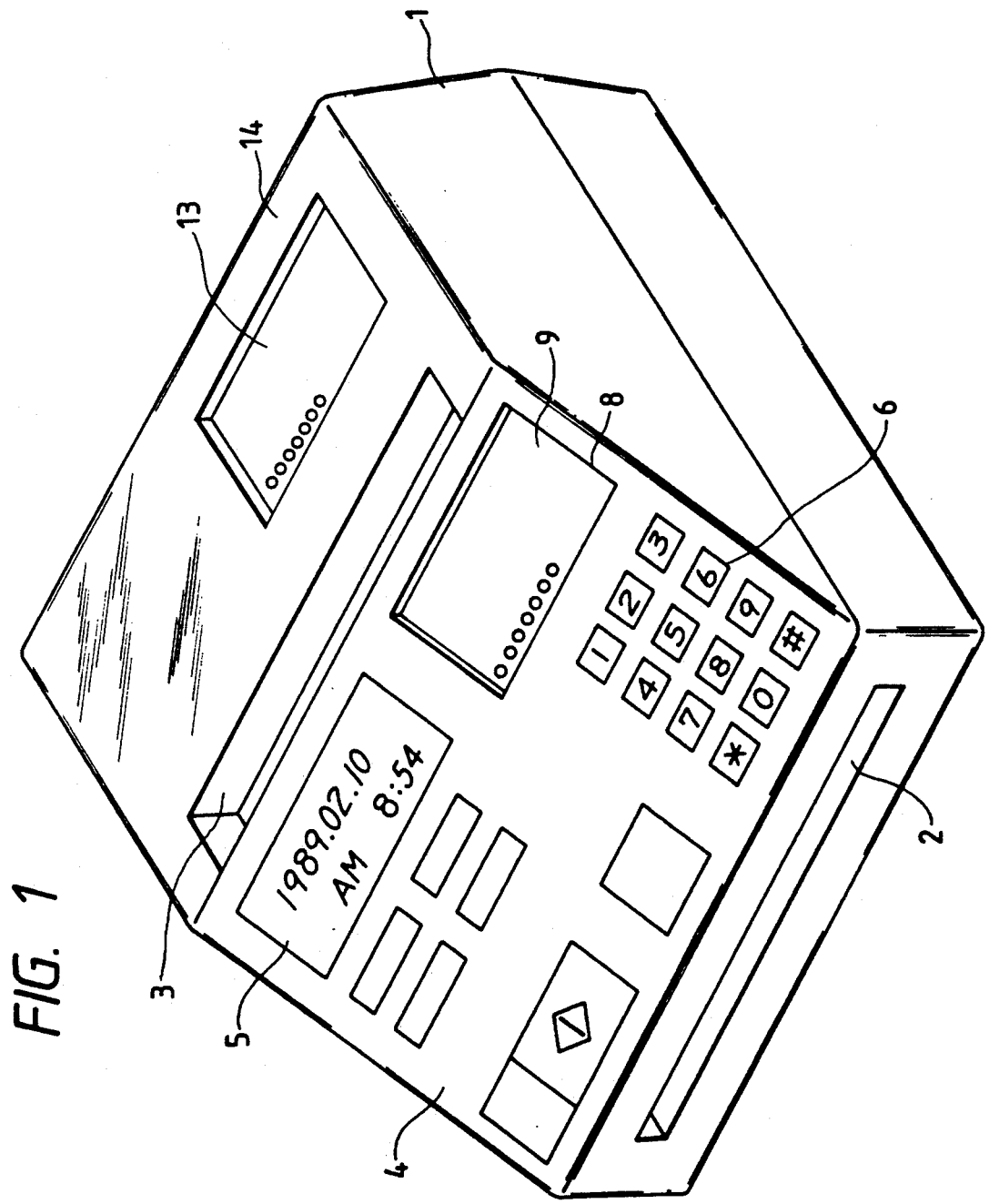
FIG. 1 is a perspective view of an entire system implementing the first embodiment of the invention.
Figure 2:
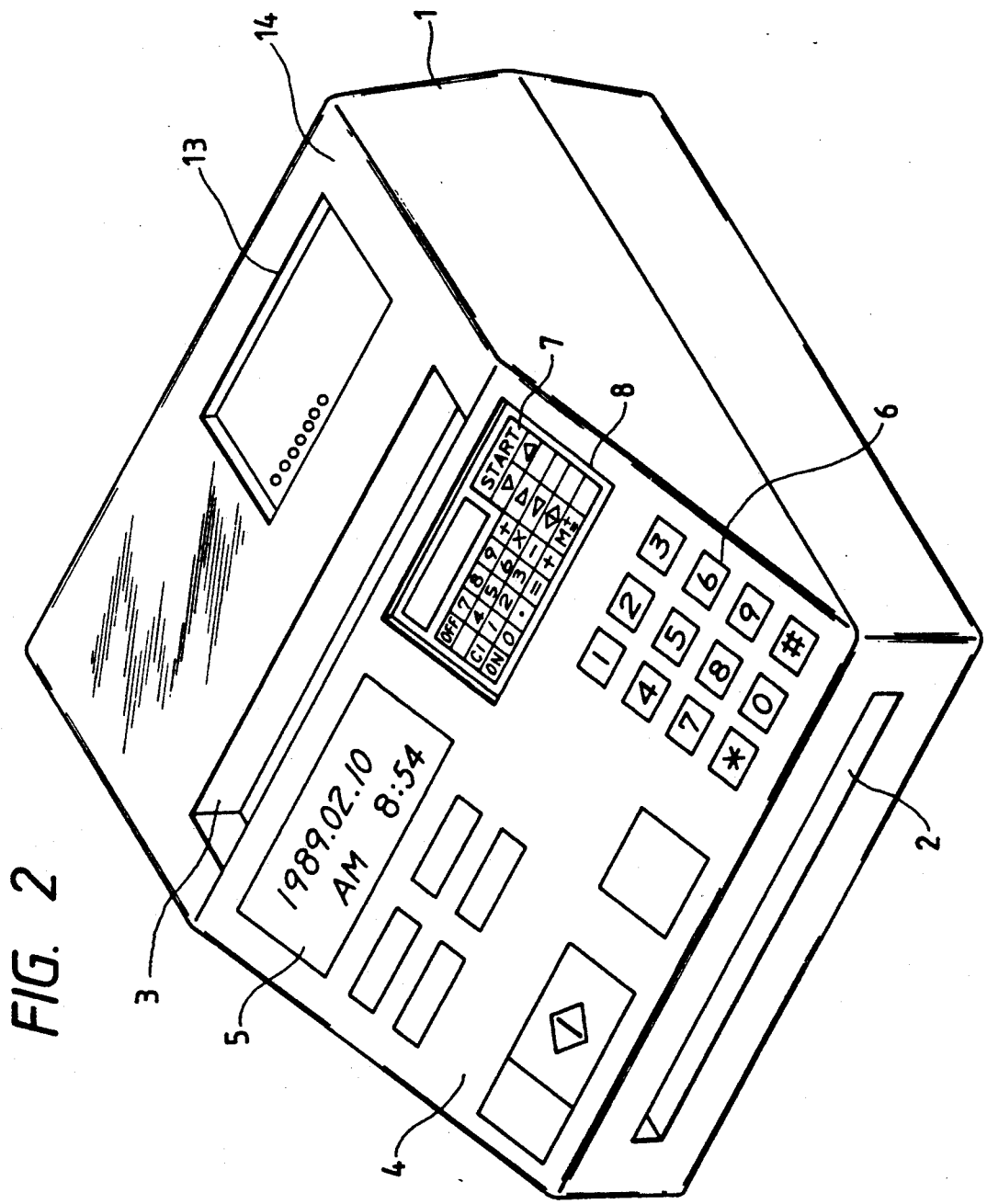
FIG. 2 shows the system in FIG. 1 with a card mounted in the first mounting portion.
Figure 3:
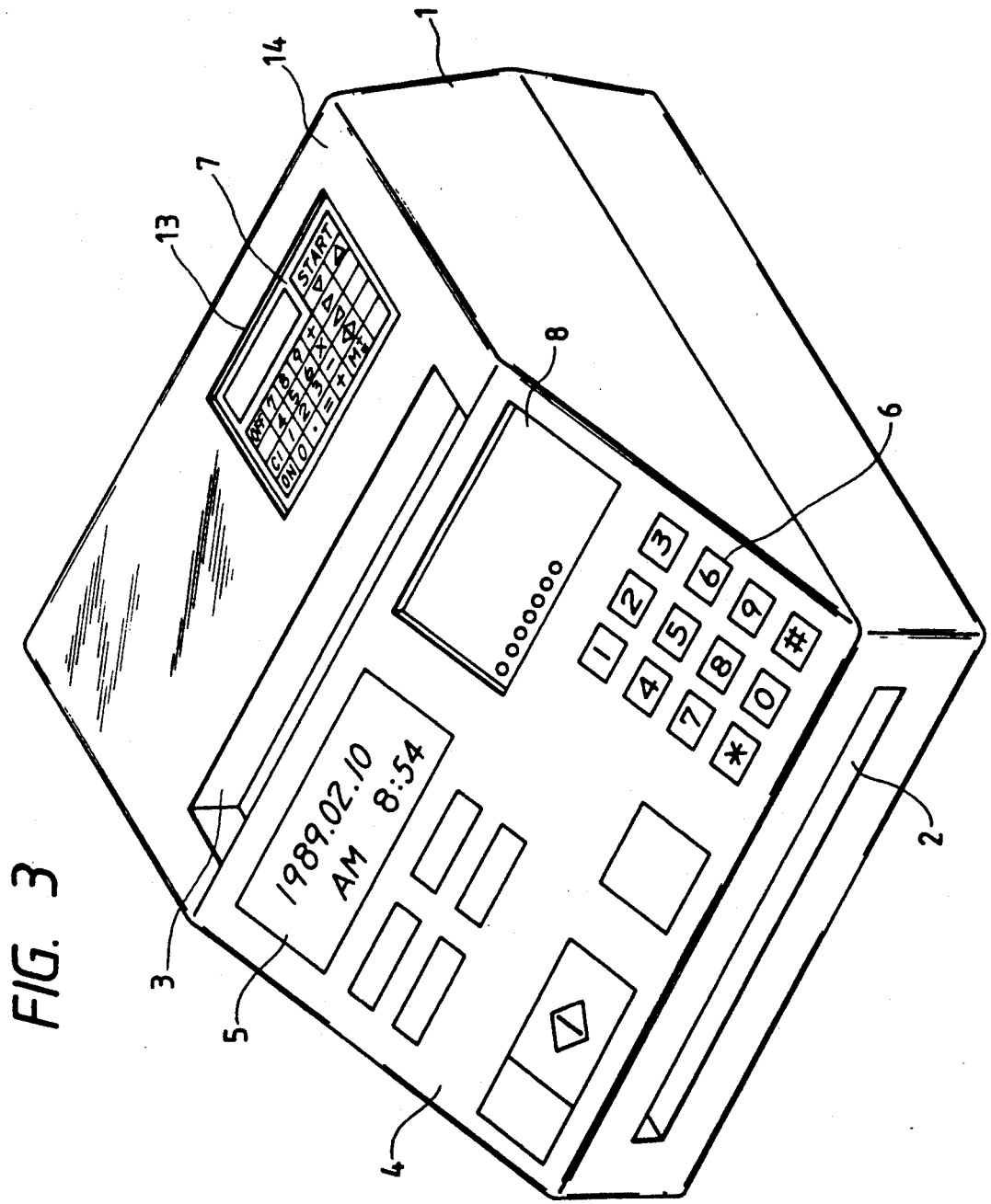
FIG. 3 shows the system in FIG. 1 with a card mounted in the second mounting portion.
Figure 4:
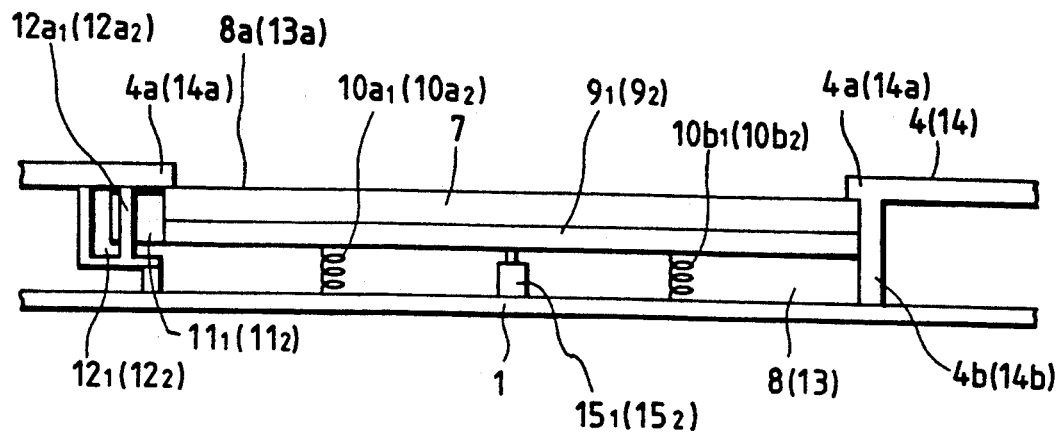
FIG. 4 is a detailed view of the mounting portions shown in FIGS. 2 and 3 with cards mounted.
Figure 5:
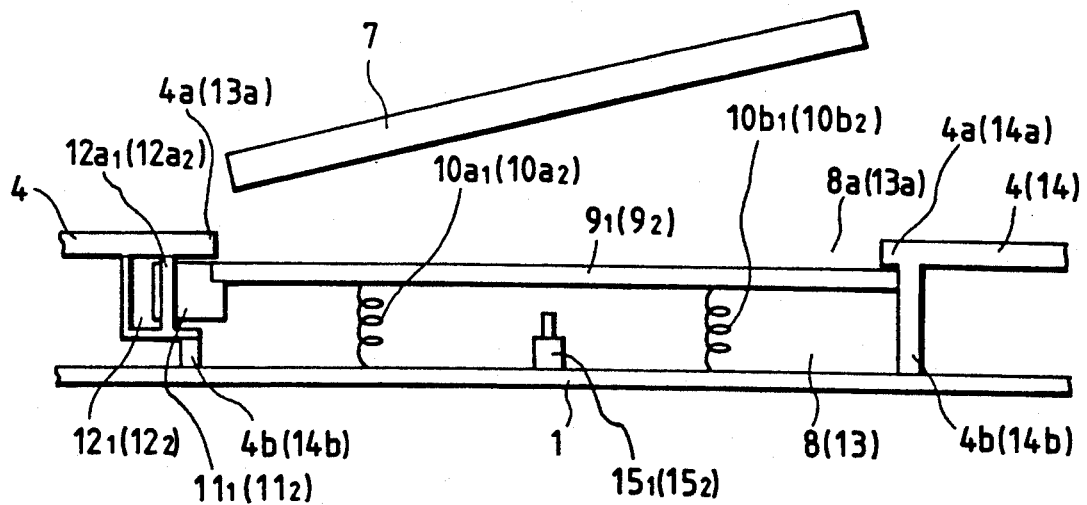
FIG. 5 is a detail view of the mounting portion shown in FIG. 1 with no card mounted.
Figure 6:
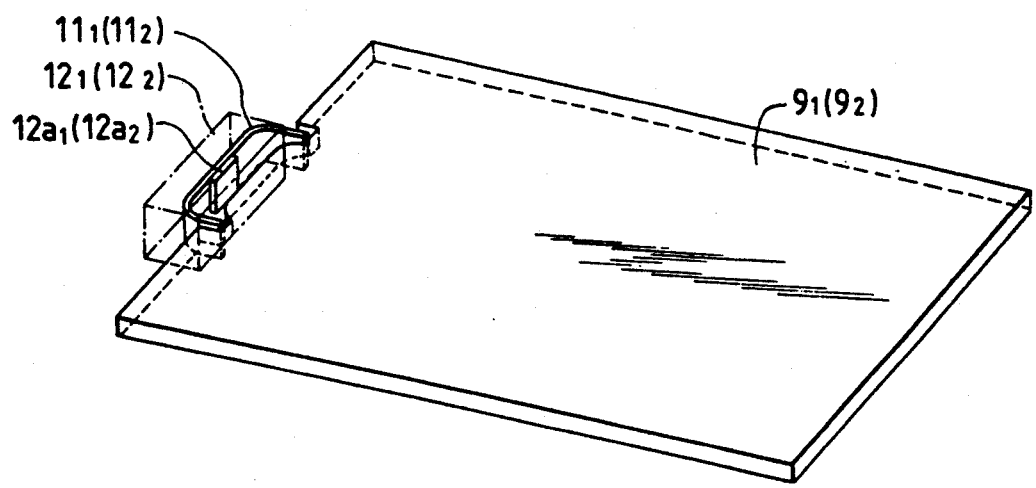
FIG. 6 is an explanatory view of the relation between an installation plate and a flat spring shown in FIG. 1.
Figure 7:
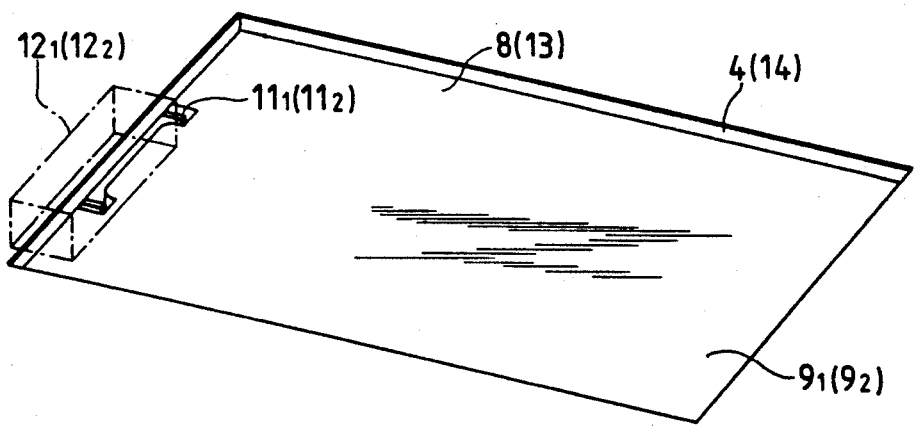
FIG. 7 is a perspective drawing of the flat spring shown in FIG. 5 which is viewed from above.
Figure 8:
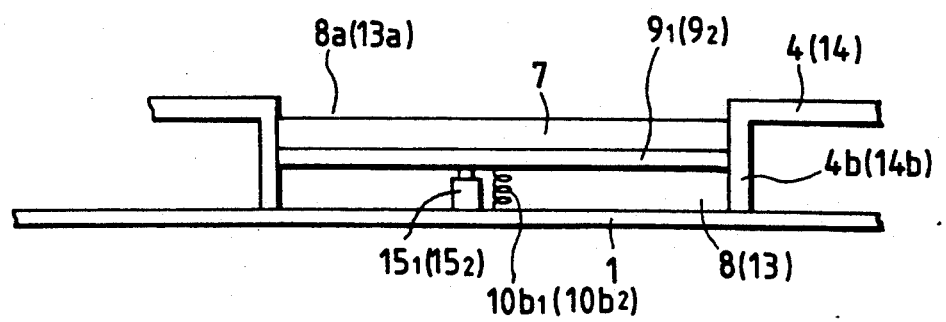
FIG. 8 is a lateral view of the mounting portions shown in FIGS. 2 and 3.

The first embodiment of the invention is described below in conjunction with the drawings. FIGS. 1, 2, and 3 show the appearance of a facsimile system having an electronic telephone directory which acts as a data input/output unit. 1 represents a main unit, and 2, an original insertion slot provided on the front of the main unit. 3 is an outlet of originals and recording sheets and located on the top of the main unit 1. 4 is an operation panel inclining forward from the top of the main unit 1. On the operation panel 4, a display 5, ten-key pad 6, and other various keys are arranged. The operator panel 4 is provided with a first mounting portion 8 onto which a data memory card 7 is mounted. A cover 14 is provided with a second mounting portion 13 on which a data memory card 7 is mounted. These first and second mounting portions 8 and 13 have exactly the same configuration. Specifically, the first and second mounting portions 8 and 13 are recessed to have openings 8a and 13a for attaching and detaching data memory cards 7 and for operating keys on the cards 7 externally. Each of the opening 8a and 13a has a size corresponding to a card 7. The length of the openings 8a and 13a is slightly shorter than that of the card 7, and the width of the openings 8a and 13a, slightly longer than that of the card 7. This is intended to help insert the card 7 from the opening 8a or 13a of the first or second mounting portion 8 or 13, and prevent the card 7 from coming off. In the first mounting portion 8 (second) mounting portion 13, an installation plate $9_1$ ($9_2$) on which a card 7 is placed is provided to be vertically movable as shown in FIGS. 4 and 5. The installation plate $9_1$ ($9_2$) is pressed to a periphery 4a (14a) of the opening 8a (13a) by means of coil spring $10a_1$ and $10b_1$ ($10a_2$ and $10b_2$), acting as a first pressing member. The first (second) mounting portion 8 (13) at a side of the installation plate $9_1$ ($9_2$) is provided with a second pressing member which is a flat spring $11_1$ ($11_2$) as shown in FIGS. 6 and 7. The flat spring $11_1$ ($11_2$) is installed in a storage chamber $12_1$ ($12_2$) in the first (second) mounting portion 8 (13), and attached to an attachment member $12a_1$ ($12a_2$) within the storage chamber $12_1$ ($12_2$). The circumference of the first (second) mounting portion 8 (13) constitutes a side wall 4b (14b). The periphery 4b (14b) on the shorter side of the opening of the mounting portion 8 (13) is protruded to prevent the card 7 from coming off, while the periphery 4a (14a) on the longer side of the opening is not protruded to help mount the card 7. When the card 7 is mounted, the card 7 is clamped between the installation plate $9_1$ ($9_2$) and the periphery 4a (14a) of the opening 8a (13a) by means of springs $10a_1$ and $10b_1$ ($10a_2$ and $10b_2$). The coil springs $10a_1$ and $10b_1$ ($10a_2$ and $10b_2$), acting as the first pressing member, position the card 7 vertically. One end of the card 7 is pressed by the flat spring $11_1$ ($11_2$) acting as the second pressing member. Thereby, another end of the card 7 is pressed to the side wall. The second pressing member or the flat spring $11_1$ ($12_2$) position the card 7 laterally. The installation plate $9_1$ ($9_2$) is provided with an array of light receiving elements to be described later. 15 represents a card detection switch.

Figure 9:
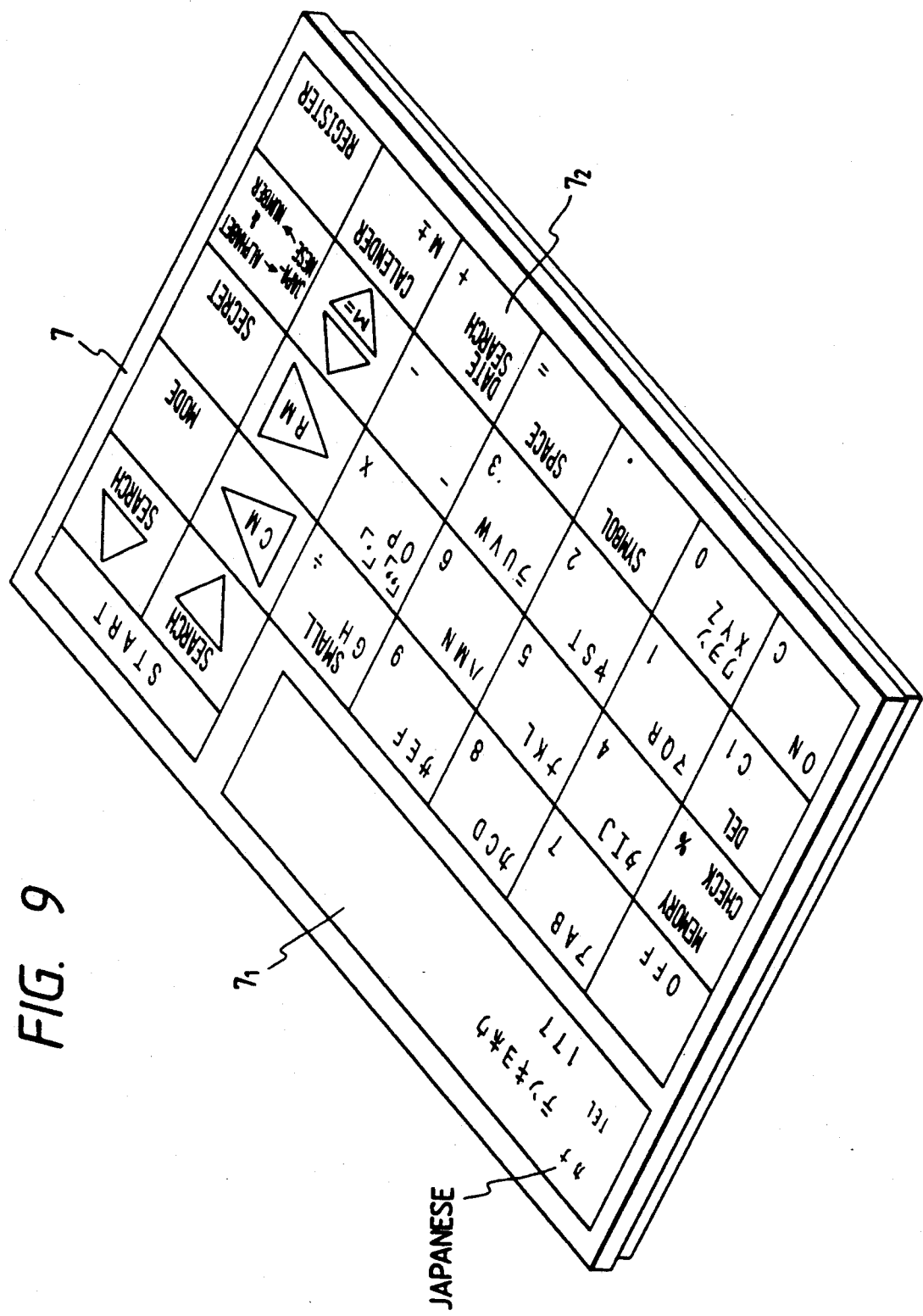
FIG. 9 is a perspective view of a data memory card used in the system shown in FIGS. 2 and 3 which is viewed from the front.
Figure 10:
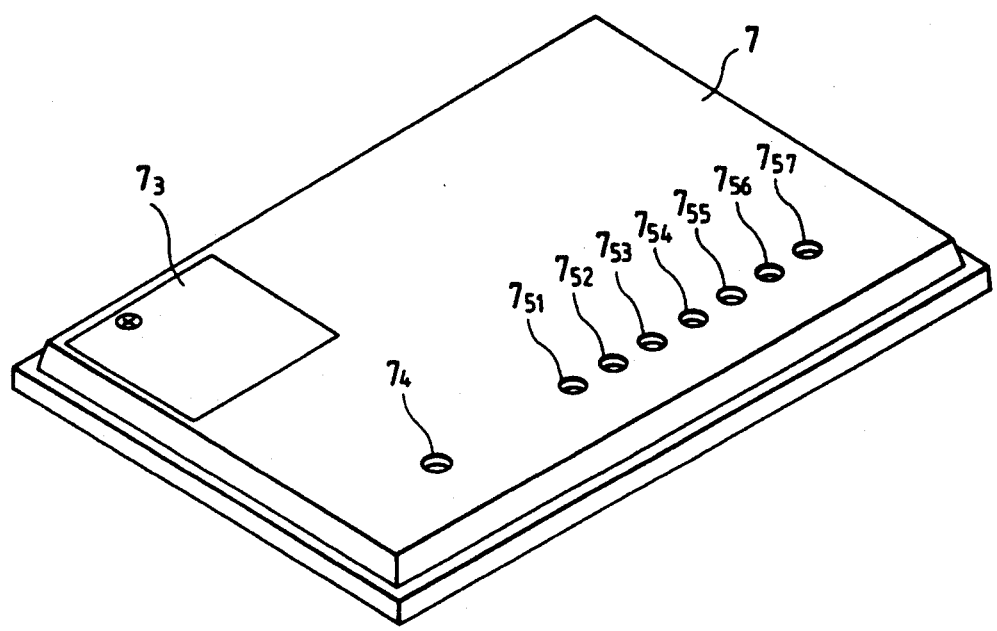
FIG. 10 is a perspective view of the data memory card shown in FIG. 9 which is viewed from the back.
Figure 11:
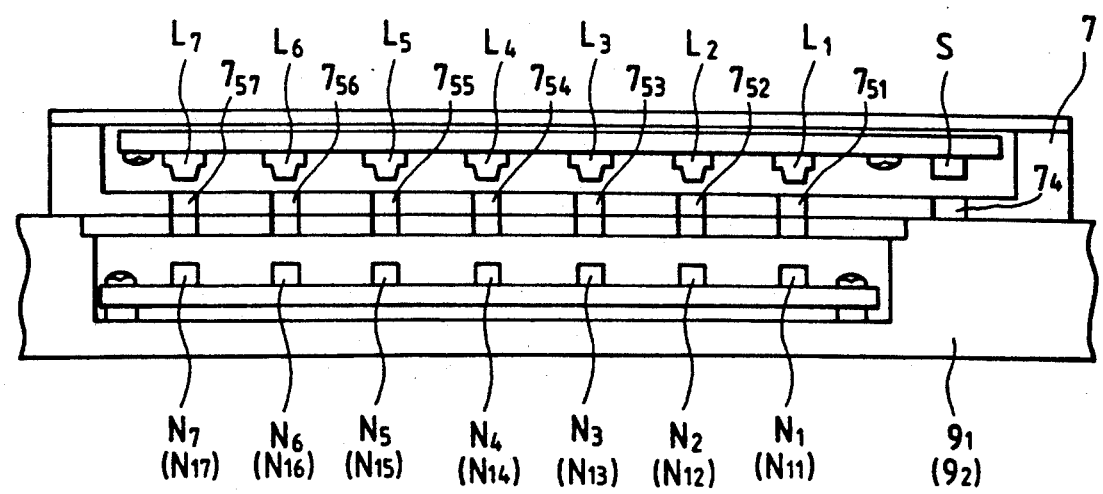
FIG. 11 is an explanatory view of the relation between a light receiving unit shown in FIG. 1 and a light emitting unit shown in FIG. 10.

On the front of the data memory 7, a display $7_1$ and various data keys $7_2$ are arranged as shown in FIG. 9. The data keys $7_2$ are used to actuate functions of a telephone directory, or identify data items contained in the card 7. The display $7_1$ displays a data item identified. On the back of the card 7, a battery cover $7_3$, RESET switch window $7_4$, and LED windows $7_{51}$ to $7_{57}$ are arranged as shown in FIG. 10. The battery cover $7_3$ is fixed to the card 7 with screws, wherein a lithium battery is received. When the center of the RESET switch window $7_4$ is pressed with a pin, a RESET switch S within the card 7 is actuated to clear various data items stored in memory of the card 7. The LED windows $7_{51}$ to $7_{57}$ transmit light beams of light emitting diodes $L_1$, $L_2$, $L_3$, $L_4$, $L_5$, $L_6$, and $L_7$ installed in the card. The light emitting diods $L_1$ to $L_7$ are opposed to seven light receiving elements $N_1$, $N_2$, $N_3$, $N_4$, $N_5$, $N_6$, and $N_7$ as shown in FIG. 11. Depending on the light receiving results of these light receiving elements $N_1$ to $N_7$, data items selected with keys on the card 7 are entered into the main unit of the facsimile system.

Figure 12:
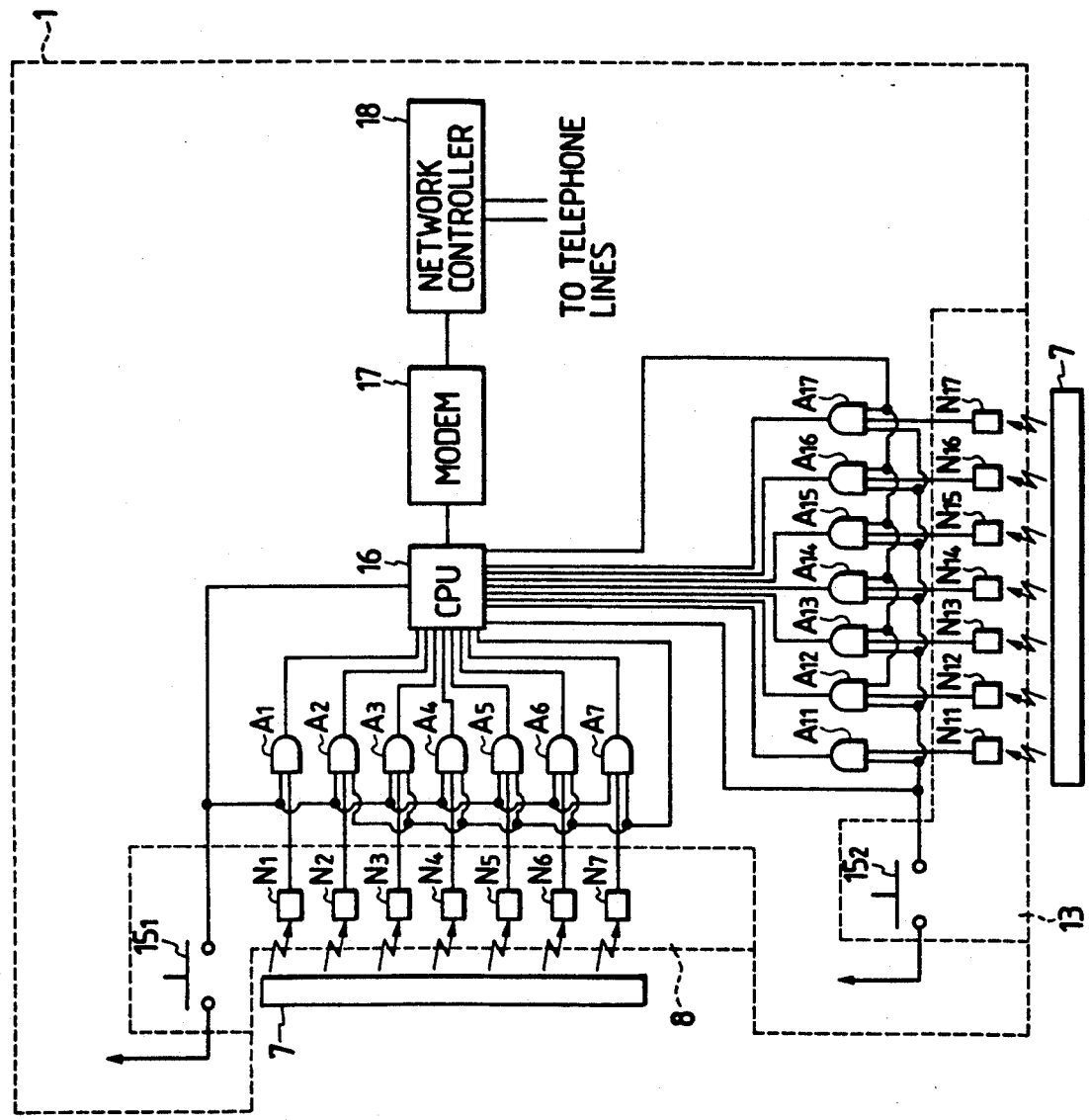
FIG. 12 shows a control circuit for actuating a communication means according to a detection switch which is incorporated in the system shown in FIG. 1.

FIG. 12 shows a control circuit which enables light receiving elements $N_1$ to $N_7$, or $N_{11}$ to $N_{17}$, acting as a communication means according to a detection switch $15_1$ or $15_2$. The switch and light receiving elements are provided in the first and second mounting portions 8, 13. $A_1$ to $A_7$, or $A_{11}$ to $A_{17}$ are AND gates. The AND gates $A_1$ to $A_7$, or $A_{11}$ to $A_{17}$, are connected with outputs of the detection switch $15_1$ or $15_2$, and the light receiving elements $N_1$ to $N_7$, or $N_{11}$ to $N_{17}$. A CPU 16 is inputted by a signal sent from the detection switch $15_1$ or $15_2$. The CPU 16 applies signals to the AND gates $A_2$ to $A_7$, or $A_{12}$ to $A_{17}$, except the AND gate $A_1$ or $A_{11}$. 17 is a modem, and 18, a network controller.

Next, the operations of the facsimile system having the aforesaid configuration are described.

When a card 7 is mounted in the first mounting portion 8, the detection switch $15_1$ turns ON. Then, the fact that the card 7 has been mounted in the first mounting portion 8 is detected. After that, when a card 7 is mounted in the second mounting portion 13, the detection switch $15_2$ turns ON in the same manner. Then, the fact that the card 7 has been mounted in the second mounting portion 13 is detected. In either case, when the card 7 is mounted in the first or second mounting portion, the detection switch $15_1$ or $15_2$ in the first or second mounting portion turn ON. The fact that the card 7 has been mounted in the first or second mounting portion is transmitted to the CPU 16. At the same time, one of two inputs of the AND gate $A_1$ or $A_{11}$ is set to 1.

When the light receiving element $N_1$ or $N_{11}$ detects light emitted from the light emitting element $L_1$, the output of the AND gate $A_1$ or $A_{11}$ reaches the CPU 16.

When an operator operates the card 7 mounted in the first mounting portion 8, communication means of the first mounting portion 8 is made active. On the contrary, when an operator operates the card 7 mounted in the second mounting portion 13, communication means of the second mounting portion 13 becomes active.

However, when one of the communication means in the first and second mounting portions 8 and 13 has already been active, even if a card mounted in another mounting portion is operated, another communication means is inactive or inhibited.

When an operator operates the card in the first mounting portion 8, the card 7 causes the light emitting element $L_1$ to emit light. Then, the seven light emitting elements emit light with information of a telephone number. Specifically, the CPU 16 observes an output of the AND gate $A_1$ or $A_{11}$ of the first or second mounting portion in order to learn in which mounting portion the operated card is mounted. After that, the CPU 16 sets inputs of the AND gates $A_2$ to $A_7$ in the first mounting portion 8 to "1". This enables to input the signals sent from the AND gates $A_2$ to $A_7$ in the first mounting portion 8. The inputs of the AND gates $A_{12}$ to $A_{17}$ in the second mounting portion 13 are set to "0", thus disabling to input the signals sent from AND gates $A_{12}$ to $A_{17}$ in the second mounting portion 13. Thereby, the light receiving elements $N_1$ to $N_7$ in the first mounting portion 8 detect light emitted from the light emitting elements $L_1$ to $L_7$. The outputs of the light emitting elements which have detected the light are applied to the CPU 16 via the AND gates. The CPU 16 actuates a network controller 18 via a modem 17.

The CPU 16 may reset inputs of AND gates $A_2$ to $A_7$ to "0" after one communication. Alternatively, the CPU 16 may set the AND gates $A_2$ to $A_7$ in the first mounting portion 8 to "1" continuously after one communication. Assume that after one communication, the inputs of the AND gates $A_2$ to $A_7$ are held at "1". To release this state, the card must be removed from the first mounting portion 8. When the card 7 is removed from the first mounting portion 8, the detection switch $15_1$ turns OFF. Inputs of the AND gate $A_1$ are set to "0". The CPU 16 resets the inputs of the AND gates $A_2$ to $A_7$ in the first mounting portion 8 to "0", so that signals sent from light receiving elements will not reach the CPU 16.

In either case, the CPU 16 resets the inputs of the AND gates $A_2$ to $A_7$, and $A_{12}$ to $A_{17}$ in two mounting portions to "0" or initial states until the outputs of the AND gates $A_1$ and $A_{11}$ become "1". Therefore, even if external light enters the light receiving elements in the mounting portion 8 or 13, the facsimile system does not malfunction.

As described previously, when cards 7 are mounted in two card mounting portions on the main unit of a facsimile system, a mounting portion receiving a card 7 which is operated earlier is enabled to communicate.

When only one card 7 is mounted in the main unit, the card 7 can, needless to say, communicate with the main unit.

Next, the operating state of the communication means with a card 7 mounted in either the first or second mounting portion 8 or 13 is described more specifically. A card 7 is held in such a way that LED windows $7_{51}$ to $7_{57}$ on the back of the card 7 may match light receiving elements $N_1$ to $N_7$ in the facsimile system. The card 7 is inclined, and with one end of the card 7, an installation plate $9_1$ or $9_2$ is pressed against a force of springs $10a_1$ and $10b_1$, or $10a_2$ and $10b_2$ through an opening $8a$ or $13a$ of a first or second mounting portion 8 or 13. Thus, one end of the card 7 is clamped between the periphery $4a$ or $14a$ of the opening $8a$ or $13a$ and the installation plate $9_1$ or $9_2$. With another end of the card 7, the installation plate $9_1$ or $9_2$ is also pressed against a force of the springs $10a_1$ and $10b_1$, or $10a_2$ and $10b_2$. Thus, another end of the card 7 is clamped between the periphery $4a$ or $14a$ of the opening $8a$ or $13a$ and the installation plate $9_1$ or $9_2$. Then, when the card 7 is released, the card 7 is pushed towards a side wall $4b$ or $14b$ by a flat spring $11_1$ or $11_2$ acting as a second pressing member, pressed by the installation plate $9_1$ or $9_2$ due to a force of the coil springs $10a_1$ and $10b_1$, or $10a_2$ and $10b_2$ acting as a first pressing member, and then clamped between the installation plate $9_1$ or $9_2$ and the periphery $4a$ or $14a$ of the opening $8a$ or $13a$.

As mentioned above, the card 7 is positioned vertically by coil springs $10a_1$ and $10b_1$, or $10a_2$ and $10b_2$, acting as the first pressing member, and laterally by the flat spring $11_1$ or $11_2$ acting as the second pressing member. The switch $15_1$ or $15_2$ is turned ON. Light emitting diodes $L_1$ to $L_7$ and light receiving elements $N_1$ to $N_7$, or $N_{11}$ to $N_{17}$, are positioned correctly to enable a correct communication.

Keys $7_2$ on the card 7 are visible to an operator through an opening $8a$ or $14a$. The operator presses intended keys $7_2$ of the card 7 with his/her finger. Thereby, information specified with the keys $7_2$ on the card 7 is sent as optical information from light emitting diodes $L_1$ to $L_7$ to light receiving elements $N_1$ to $N_7$, or $N_{11}$ to $N_{17}$, in the main unit of the facsimile system.

To remove the card 7 from the mounting portion 8 or 13, while the card 7 is being pressed against a force of springs $10a_1$ and $10b_1$, or $10a_2$ and $10b_2$, another end of the card 7 is released from clamp between the periphery $4a$ or $14a$ of the opening $8a$ or $13a$ and the installation plate $9_1$ or $9_2$. Then one end is released from clamp between the periphery $4a$ or $14a$ of the opening $8a$ or $13a$ and the installation plate $9_1$ or $9_2$. Thus, the card 7 can be extracted from the mounting portion 8 or 13.

Figure 23:
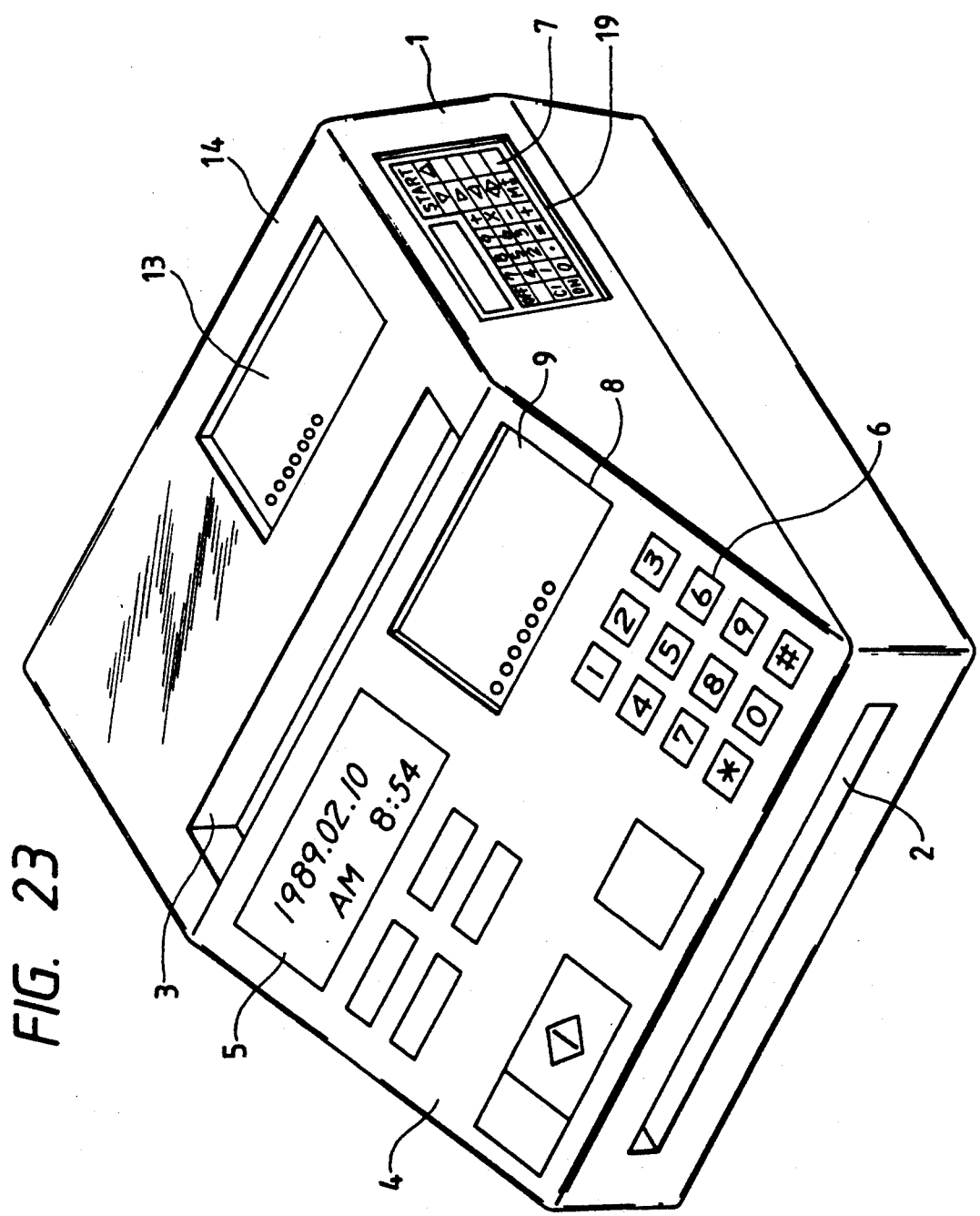
FIG. 23 shows the system of each embodiment in FIG. 1 having a mounting portion on its side part.
Figure 24:
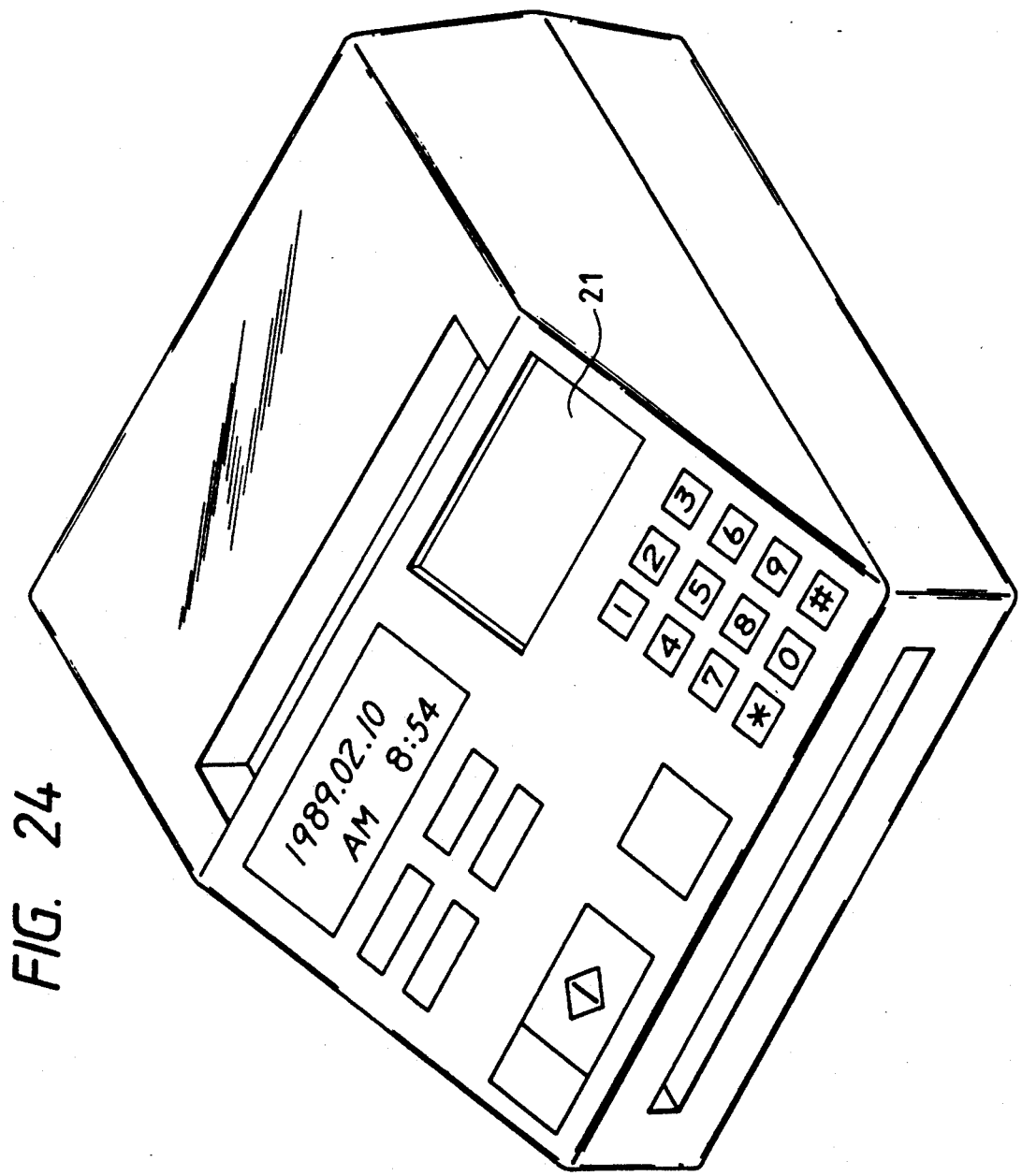
FIG. 24 shows a prior system.

In the aforesaid embodiment, the facsimile system has two card mounting portions. Assuming that the invention is implemented in a facsimile system having three or more mounting portions as shown in FIG. 23, only the mounting portion in which a card 7 which is operated earlier than the other cards is mounted, is enabled to communicate.

The second embodiment of the invention is described below. The same components as those for the first embodiment are assigned the same symbols and numerals. The specific description is omitted.

The second embodiment enables a mounting portion in which a card is mounted first to communicate.

Figure 13:
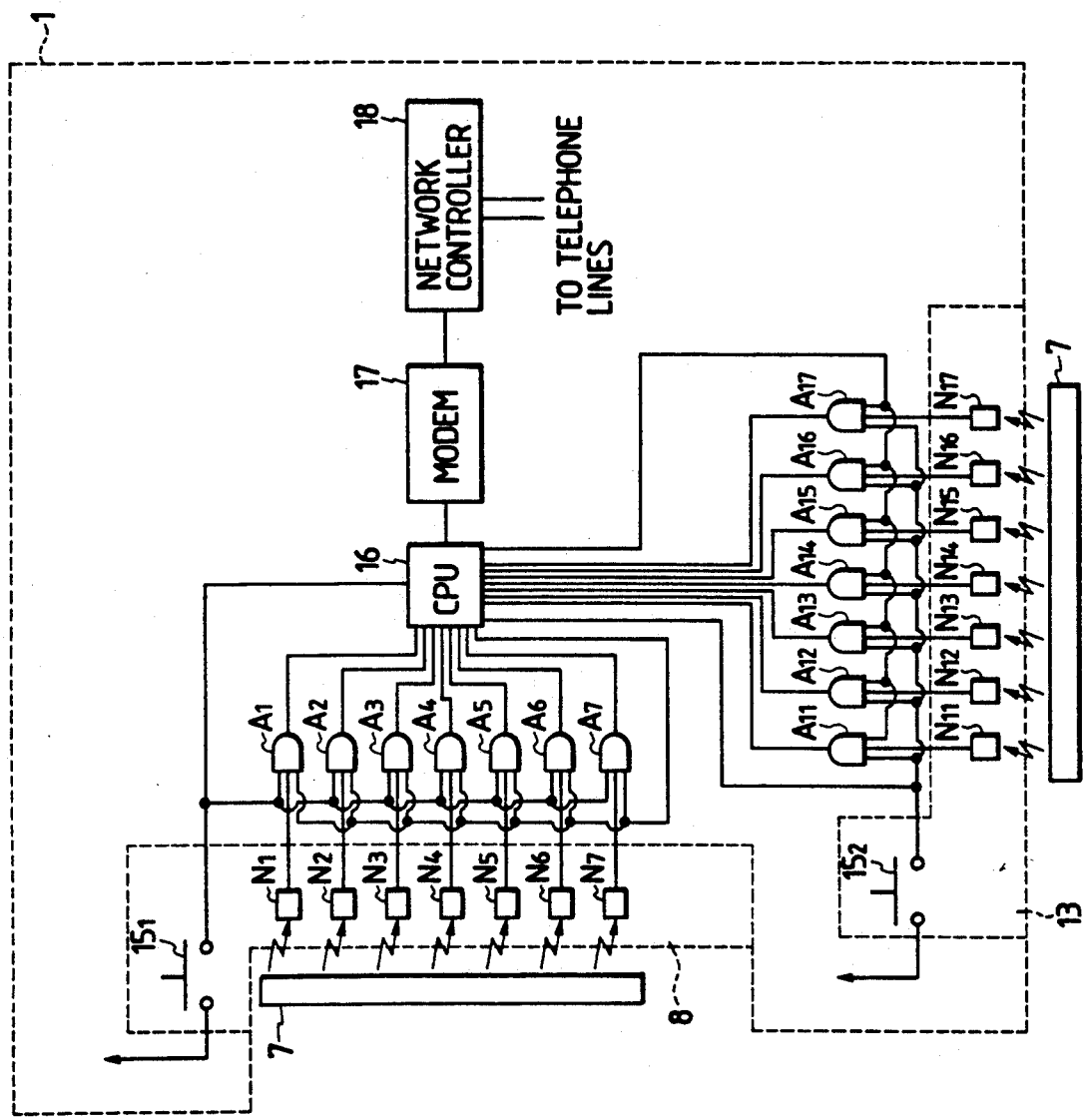
FIG. 13 shows a control circuit for actuating a communication means according to a detection switch which is incorporated in the system shown in FIG. 1 and relates to the second embodiment of the invention.

In a control circuit shown in FIG. 13, signals from detection switches $15_1$ and $15_2$, light receiving elements $N_1$ to $N_7$ and $N_{11}$ to $N_{17}$, and a CPU 16 are inputted to AND gates $A_1$ to $A_7$ and $A_{11}$ to $A_{17}$. This is only the difference from the control circuit shown in FIG. 12.

Next, the operations of the facsimile system having the above configuration are described.

When a card 7 is mounted in a first mounting portion 8, a detection switch $15_1$ turns ON. Then, the fact that the card 7 has been mounted in the first mounting portion 8 is informed to a CPU 16. At the same time, one input of each of AND gates $A_1$ to $A_7$ in the first mounting portion 8 is set to 1. In response to the signal, the CPU 16 sets the inputs of the AND gates $A_1$ to $A_7$ in the first mounting portion to "1", and the inputs of AND gates $A_{11}$ to $A_{17}$ in a second mounting portion 8 to "0".

When an operator operates the card 7 in the first mounting portion 8, the card 7 causes light emitting elements to emit light and thereby transmits information of a telephone number to light receiving elements in the main unit of the facsimile system. Since two inputs of each of three-input AND gates $A_1$ to $A_7$ in the first mounting portion 8 are set to "1", the signals of the seven light receiving elements can be inputted to the CPU 16.

Thereby, the light receiving elements $N_1$ to $N_7$ detect light emitted from the light emitting elements $l_1$ to $L_7$ in the card 7. The outputs of the light receiving elements which have detected the light are applied to the CPU 16 via the AND gates. The CPU 16 actuates a network controller 18 via a modem 17.

Next, when a card 7 is mounted in the second mounting portion 13, a detection switch $15_2$ turns ON. However, since a card 7 has already been mounted in the first mounting portion, the CPU 16 holds the inputs of the 3-input AND gates $A_{11}$ to $A_{17}$ at "0". Therefore, although the light emitting elements in the card 7 in the second mounting portion 13 emit light and the light is transmitted to the receiving elements, the information does not reach the CPU 16. In the state mentioned previously, when the card 7 is removed from the first mounting portion 8, the detection switch $15_1$ in the first mounting portion turns OFF. The CPU 16 sets the inputs of the 3-input AND gates in the first mounting portion to "0". At the same time, the inputs of the 3-input AND gates in the second mounting portion 13 are set to "1". Then, the information on the light emitted from the card 7 in the second mounting portion 13 can reach the CPU.

When the light receiving elements $N_{11}$ to $N_{17}$ in the second mounting portion 13 detect light emitted from the light emitting elements $L_1$ to $L_7$, the outputs of the light receiving elements which have detected the light are applied to the CPU 16 via the AND gates. The CPU 16 actuates the network controller 18 via the modem 17.

When no card 7 is mounted in either the first or second mounting portion, the detection switches $15_1$ and $15_2$ are OFF. Even if external light enters light receiving elements in the first or second mounting portion 8 or 13, the facsimile system does not malfunction.

As described previously, in a facsimile system having two card mounting portions on the main unit, a mounting portion to which a card 7 is first mounted is enabled to communicate.

In the aforesaid embodiment, a card 7 is first mounted in the first mounting portion 8. After that, another card 7 is mounted in the second mounting portion 13. If a card 7 is mounted first in the second mounting portion 13, the card 7 mounted in the second portion 13 is, needless to say, given priority.

In a facsimile system having two card mounting portions on the main unit, a mounting portion to which a card 7 is first mounted is enabled to communicate. A mounting portion to which the second card 7 is mounted cannot communicate. When only one card 7 is mounted in the main unit of the facsimile system, needless to say, the card 7 can communicate with the main unit.

In the aforesaid embodiment, a facsimile system has two card mounting portions. Even when three or more mounting portions are provided, a mounting portion to which a card 7 is first mounted is enabled to communicate with the card. Assume that a facsimile system has five mounting portions, cards 7 are mounted to mounting portions 1 to 5 in that order, and then that the cards 7 are removed from the mounting portions 1, 2, and 4. Among the remaining mounting portions 3 and 5, the mounting portion to which a card 7 has been mounted earlier can communicate.

In the aforesaid embodiment, only the mounting portion to which a card is first mounted is enabled to communicate with the card. With the same configuration as that of the circuit shown in FIG. 13, a card mounted in a mounting portion at a given position may be given priority for communication. The operations are described below.

When cards 7 are mounted in first and second mounting portions, detection switches $15_1$ and $15_2$ in the mounting portions turn ON. The fact that the cards 7 have been mounted in the first and second mounting portions is informed to the CPU 16. At the same time, one input of each of AND gates $A_1$ and $A_{11}$ in the first and second mounting portions 8 and 13 are set to "1". In response to signals sent from the detection switches $15_1$ and $15_2$ in the first and second mounting portions 8 and 13, the CPU 16 activates a communication means of a pre-determined mounting portion or the first mounting portion located in the front part of the system, but does not activate a communication means of the second mounting portion 13 located in the back part of the system. More specifically, the CPU 16 sets inputs of AND gates $A_1$ to $A_7$ in the first mounting portion 8 to "1", and AND gates $A_{11}$ to $A_{17}$ in the second mounting portion 13 to "0".

In the above state, when the card 7 is removed from the first mounting portion 8, the communication means of the second mounting portion is made active.

In the aforesaid embodiment, a first mounting portion 8 is located in the front part of a facsimile system, and a second mounting portion 13, in the back part of the system. If the second mounting portion 13 is located in the front part of the system, and the first mounting portion 8, in the back part of the system, needless to say, the card 7 mounted in the second mounting portion 13 is given priority.

As described previously, in a facsimile system having two card mounting portions on the main unit, a mounting portion receiving a card 7 which is located in the front part of the system is enabled to communicate. Another mounting portion cannot communicate.

The third embodiment of the invention is described below. The same components as those for the first embodiment are assigned the same symbols or numerals. The specific description is omitted.

The third embodiment enables only the card mounted in a mounting portion to communicate.

Figure 14:
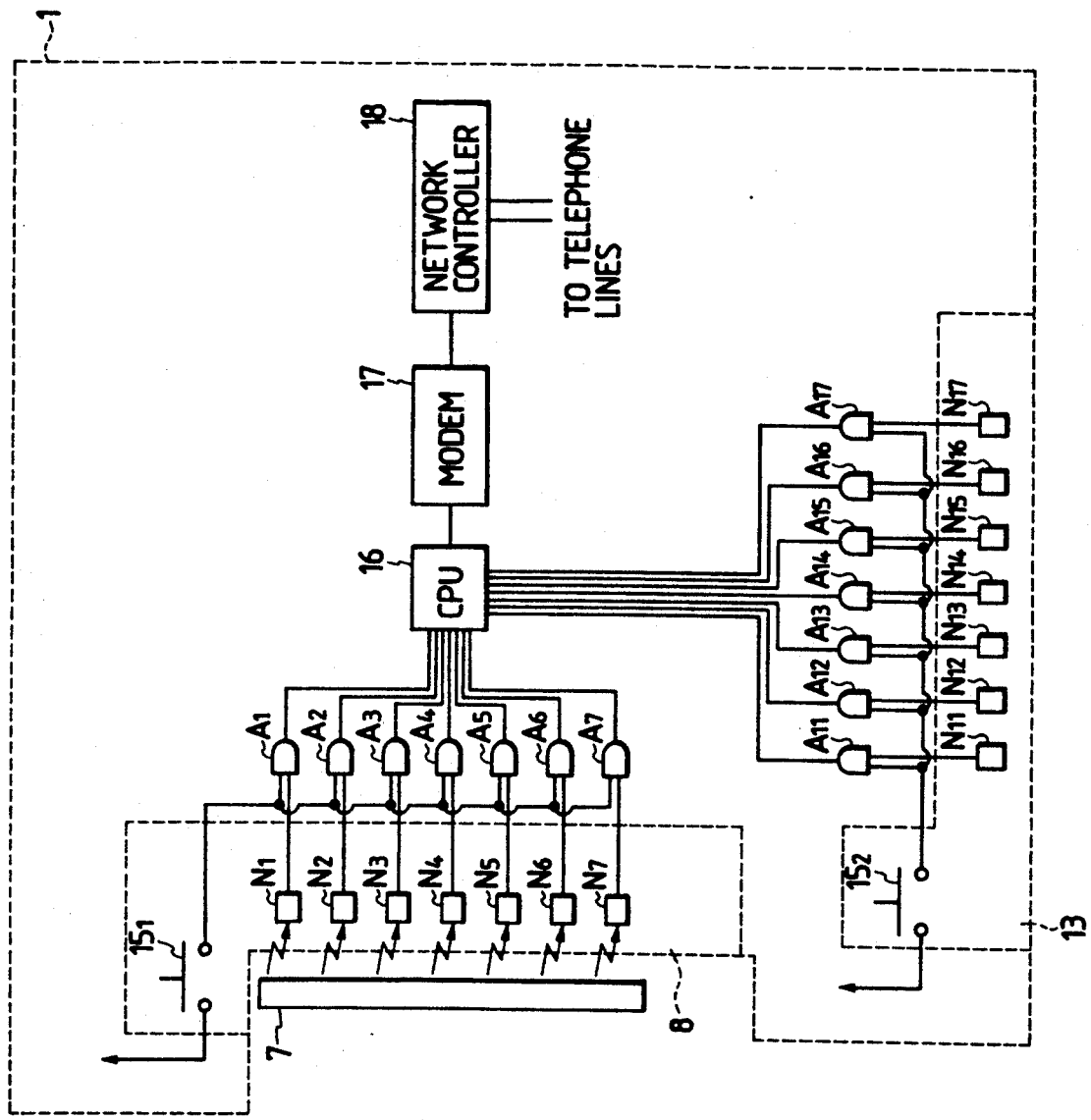
FIG. 14 shows a control circuit for actuating a communication means according to a detection switch which is incorporated in the system shown in FIG. 1 and relates to the third embodiment of the invention.

In a control circuit shown in FIG. 14, AND gates $A_1$ to $A_7$, and $A_{11}$ to $A_{17}$ are supplied with only signals sent from detection switches $15_1$ and $15_2$, and light emitting elements $N_1$ to $N_7$, and $N_{11}$ to $N_{17}$. This is the only difference from the control circuit shown in FIG. 12.

Next, the operations of a facsimile system having the configuration are described.

When a card 7 is mounted in a first mounting portion 8, a detection switch $15_1$ turns ON. The fact that the card 7 has been mounted is detected. A communication means in the main unit is made active. Specifically, when the switch $15_1$ turns ON, light receiving elements $N_1$ to $N_7$ detect light emitted from light emitting elements $L_1$ to $L_7$ in the card 7. Then, the outputs of the light receiving elements which have detected the light are applied to a CPU 16. The CPU 16 actuates a neutrals controller 18 via a modem 17.

In short, it becomes possible for a CPU to receive signals sent from light receiving elements when a card has been mounted in a mounting portion 8.

When the card 7 is removed from the first mounting portion 8, and another card 7 is mounted in the second mounting portion 13, a detection switch $15_2$ turns ON. The fact that the card 7 has been mounted in the second mounting portion 13 is detected, and a communication means of the second mounting portion is made active. When the switch $15_2$ turns ON, the light receiving elements $N_{11}$ to $N_{17}$ detect light sent from the light emitting elements $L_1$ to $L_7$, the outputs of the light receiving elements which have detected the light are applied to the CPU 16 via the AND gates. The CPU 16 actuates the network controller 18 via the modem 17.

In short, it becomes possible for the CPU to receive signals sent from light receiving elements when a card is mounted in the mounting portion 13.

When the detection switch $15_2$ is OFF, the communication means in the main unit is inactive. Therefore, even if external light enters the light receiving elements in the main unit with no card 7 mounted in a second mounting portion 13, the system does not malfunction. This is true like the case when a card 7 is mounted in the first mounting portion 8.

As described previously, in a facsimile system having two card mounting portions, only the mounting portion to which a card 7 is mounted is enabled to communicate.

In the aforesaid embodiment, a facsimile system has two card mounting portions. Even when three or more card mounting portions are provided, only the mounting portion to which a card 7 is mounted is enabled to communicate with the card.

The fourth embodiment of the invention is described below. The same components as those for the first embodiment are assigned the same symbols or numerals. The specific description is omitted.

In the fourth embodiment, when start keys on cards 7 mounted in first and second mounting portions 8 and 13 are pressed in that order, communications with both the mounting portions are performed sequentially.

Figure 15:
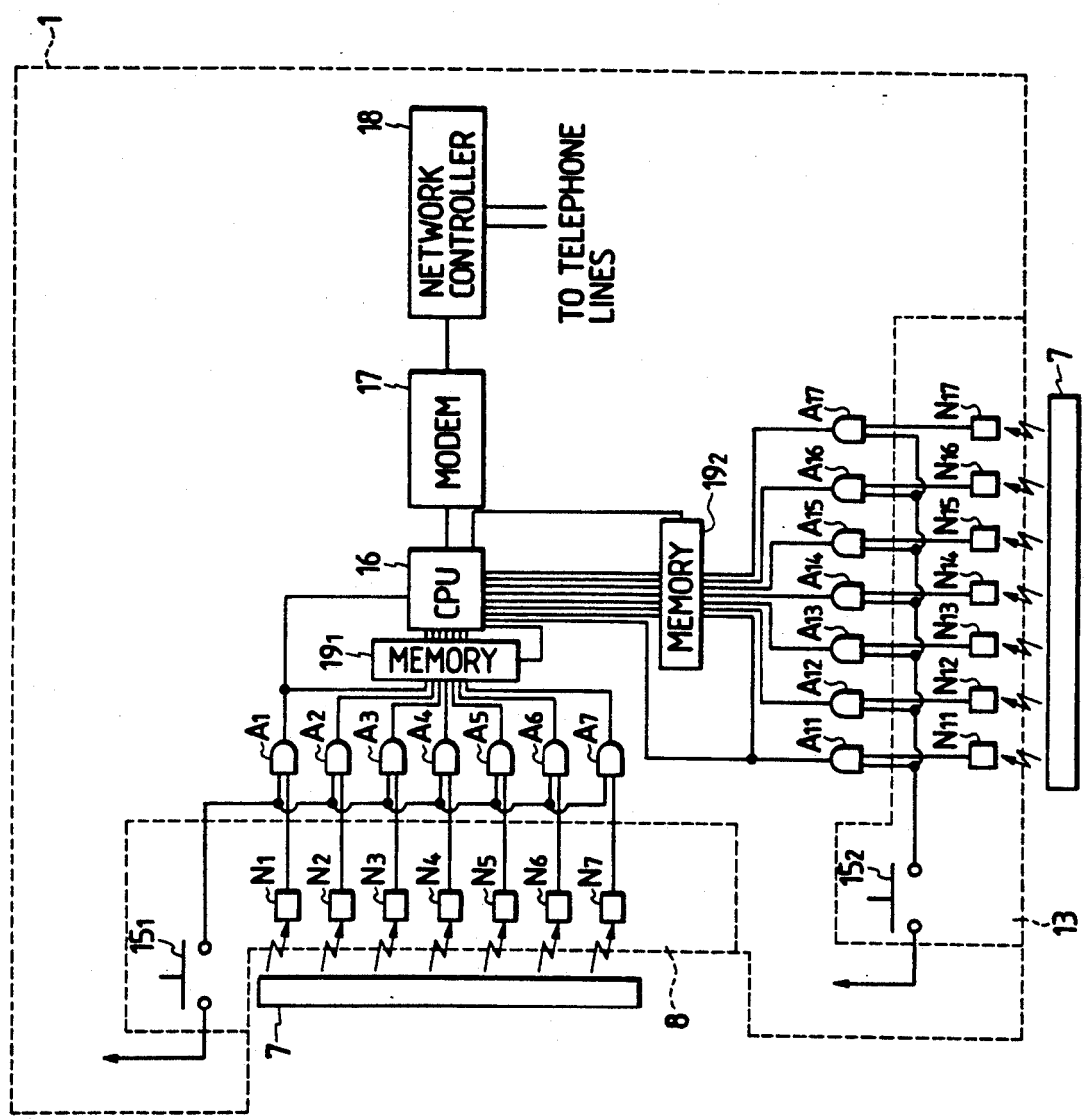
FIG. 15 shows a control circuit for actuating a communication means according to a detection switch which is incorporated in the system shown in FIG. 1 and relates to the fourth embodiment of the invention.

In a control circuit shown in FIG. 15, to AND gates $A_1$ to $A_7$, and $A_{11}$ to $A_{17}$, are inputted signals from detection switches $15_1$ and $15_2$, and light receiving elements $N_1$ to $N_7$ and $N_{11}$ to $N_{17}$, respectively. This is the only difference from the control circuit shown in FIG. 12 to a CPU 16 is inputted signals outputted from the AND gates $A_1$ and $A_{11}$. The output signals from the AND gates $A_1$ to $A_7$, and $A_{11}$ to $A_{17}$ are applied to the CPU 16 via memory circuits $19_1$ and $19_2$.

Figure 16:
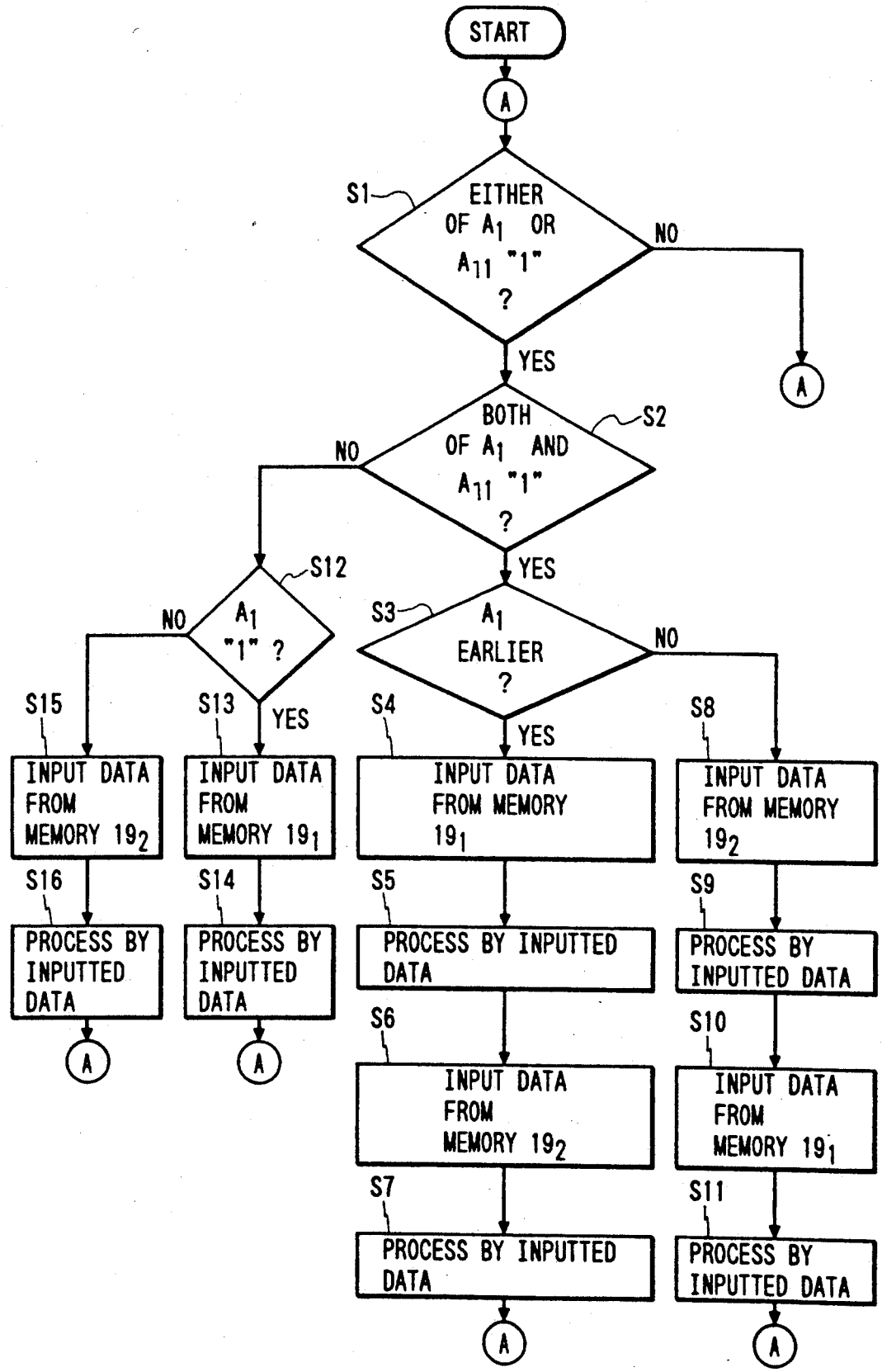
FIG. 16 is a flowchart of operations of the circuit shown in FIG. 15.

The operations of the facsimile system having the aforesaid configuration are described in conjunction with the flowchart shown in FIG. 16.

When cards 7 are mounted in first and second mounting portions 8 and 13, detection switches $15_1$ and $15_2$ turn ON. One input of each of AND gates $A_1$ to $A_7$, and $A_{11}$ to $A_{17}$, in the first and second mounting portions 8 and 13 is set to "1".

Next, assume that an operator presses a start key on the card 7 mounted in the first mounting portion 8, but does not press a start key on the card 7 mounted in the second mounting portion 13. The card 7 in the first mounting portion 8 causes a light emitting element $L_1$ to emit light. When a light receiving element $N_1$ receives the light, the output of an AND gate $A_1$ becomes 1. The card 7 in the second mounting portion 13 does not cause a light emitting element $L_1$ to emit light. Therefore, the output of an AND gate $A_{11}$ remains 0. Thereby, the CPU 16 determines at a step S1 that either of the AND gate $A_1$ or $A_{11}$ is set "1", and then proceeds to a step S2. At the step S2, the CPU 16 determines that one output of the AND gates $A_1$ and $A_{11}$ is 1, and then proceeds to a step S12. At the step S12, the CPU 16 determines that the output of the AND gate $A_1$ is 1. Then, the CPU 16 enables a memory $19_1$ in the first mounting portion 8 to output, and inhibits a memory $19_2$ in the second mounting portion 13 from outputting.

When the light emitting elements $L_1$ to $L_7$ in the card 7 mounted in the first mounting portion 8 emit light with information of a telephone number, the light receiving elements $N_1$ to $N_7$ in the first and second mounting portions 8 detect the light. The outputs of the light receiving elements $N_1$ to $N_7$ which have detected the light are stored in memory $19_1$ via the AND gates $A_1$ to $A_7$. The stored contents are transferred to the CPU 16 instantaneously at a step S13. The CPU 16 makes a call via a modem 17 and a network controller 18 to perform processing based on the input data at a step S14. During the one communication, the CPU 16 puts the memory $19_1$ in the first mounting portion 8 which has been in an output enable state into an output disable state.

Assume that an operator presses a start key on a card 7 mounted in the second mounting portion 13, but does not press a start key on a card 7 mounting in the first mounting portion. The execution sequence before a step S12 is identical to that mentioned previously, and thereof not described here. At the step 12, the CPU 16 determines that the output of an AND gate $A_{11}$ is 1. Then, the CPU 16 enables a memory $19_2$ in the second mounting portion 13 to output, and inhibits a memory $19_1$ in the first mounting portion 8 from outputting.

Thereby, data on the data memory card 7 in the second mounting portion 17 which is stored in memory $19_2$ is transferred to the CPU 16 instantaneously at a step S13. The CPU 16 makes a call via the modem 17 and the network controller 18 to perform processing based on the input data at a step 14.

Next, assuming that start keys on cards 7 mounted in first and second mounting portions 8 and 18 are pressed in that order, communications with both the mounting portions are performed sequentially.

In short, if the start keys on cards 7 mounted in the first and second mounting portions 8 and 13 are pressed sequentially, the cards 7 cause light emitting elements $L_1$ to emit light. The outputs of AND gates $A_1$ and $A_{11}$ are applied to the CPU 16. Then, the CPU 16 determines at a step S1 that either of the AND gate $A_1$ or $A_{11}$ is set to 1, and proceeds to a step S2. The CPU 16 determines at the step S2 that both the AND gates $A_1$ and $A_{11}$ are set to 1, and then proceeds to a step S3. At the step S3, the CPU 16 determines which output of the AND gate $A_1$ or $A_{11}$ is provided earlier. If it is determined that the output of the AND gate $A_1$ is provided earlier, the CPU 16 puts the memory $19_1$ into an output enable state and the memory $19_2$ into an output disable state, and then proceeds to a step S4. When the light emitting elements $L_1$ to $L_7$ in the card 7 mounted in the first mounting portion 8 emit light with information of a telephone number, the light receiving elements $N_1$ to $N_7$ in the first and second mounting portions 8 and 13 detect the light. The outputs of the light receiving elements $N_1$ to $N_7$ which have detected the light are stored in memory $19_1$ via the AND gates $A_1$ to $A_7$. The stored contents are transferred to the CPU 16 instantaneously at a step S4. At a step S5, the CPU 16 makes a call via the modem 17 and the network controller 18 to perform processing based on the input data. After one communication, the CPU 16 puts the memory $19_1$ in the first mounting portion 8 which has been in an output enable state into an output disable state, but puts the memory $19_2$ in the second mounting portion 13 into an output enable state.

When the light emitting elements $L_1$ to $L_7$ in the card mounted in the second mounting portion 8 emit light with information of a telephone number, the light receiving elements $N_{11}$ to $N_{17}$ in the second mounting portion 13 detect the light. The outputs of the light receiving elements $N_{11}$ to $N_{17}$ which have detected the light are stored in memory $19_2$ via the AND gates $A_{11}$ to $A_{17}$. The stored contents are transferred to the CPU 16 instantaneously at a step S6. At a step S7, the CPU 16 makes a call via the modem 17 and network controller 18 to perform processing based on the input data.

Assuming that start keys on cards 7 mounted in second and first mounting portions 13 and 8 are pressed in that order, the data contained in the cards 7 in the second and first mounting portions 13 and 8 are transmitted sequentially. The execution sequence before a step S3 is identical to that mentioned previously, and thereof not described here.

When the CPU 16 determines at the step S3 that the output of an AND gate $A_1$ is provided later, the CPU 16 puts the memory $19_2$ into an output enable state and the memory $19_1$ into an output disable state, and then proceeds to a step S8. Therefore, the data contained in the data memory card 7 in the second mounting portion 13 is transferred to the CPU 16 instantaneously at a step S8. At a step S9, the CPU 16 makes a call via the modem 17 and the network controller 18 to perform processing based on the input data. After one communication, the CPU 16 puts the memory $19_2$ in the second mounting portion 13 which has been in an output enable state into an output disable state, and the memory $19_1$ in the first mounting portion 8 into an output enable state.

Thereby, the data contained in the data memory card 7 in the first mounting portion 8 which is stored in memory $19_1$ is transferred to the CPU 16 instantaneously at a step S10. At a step S11, the CPU 16 makes a call via the modem 17 and network controller 18 to perform processing based on the input data.

Thus, the CPU 16 works properly even when the start keys on the cards 7 mounted in the first and second mounting portions 8 and 13 are pressed almost simultaneously. This prevents an incorrect operation resulting from the fact that the CPU 16 receives signals from the light receiving elements in both the mounting portions simultaneously.

As mentioned previously, when cards 7 are mounted in a facsimile system having two card mounting portions, only the mounting portion accommodating the card 7 which is operated earlier is enabled to communicate When two cards 7 are operated simultaneously, the input data items are processed sequentially.

When only one card 7 is mounted in the main unit of a facsimile system, the card is, needless to say, enabled to communicate with the main unit.

In the aforesaid embodiment, a facsimile system has two mounting portions. For a facsimile system having three or more mounting portions are provided, when a plurality of cards among the cards 7 mounted in the system is operated, the data items sent from the respective communication means can be processed sequentially. Thus, all data contained in the cards are processed.

In the aforesaid embodiment, card mounting portions are installed on an operator panel 4 and a recording 14. However, the card mounting portions can be arranged at any locations in a facsimile system.

In the aforesaid embodiment, memories $19_1$ and $19_2$ are provided in one-to-one correspondence with first and second mounting portions 8 and 13. There may be only a single memory. Then, different data storage areas are allocated in the memory, so that the data items sent from two mounting portions are temporarily stored in the areas. Then, the CPU 16 may read the data items from the memory sequentially.

The fifth embodiment of the invention is described below. The same components as those for the first embodiment are assigned the same symbols. The specific description is omitted.

In the fifth embodiment, when a CPU 16 makes a call based on data contained in a card 7 which is operated earlier, if a called party is absent and does not answer the call, the call is canceled. Then, the CPU 16 makes another call based on data contained in a card 7 which is operated later.

Figure 17:
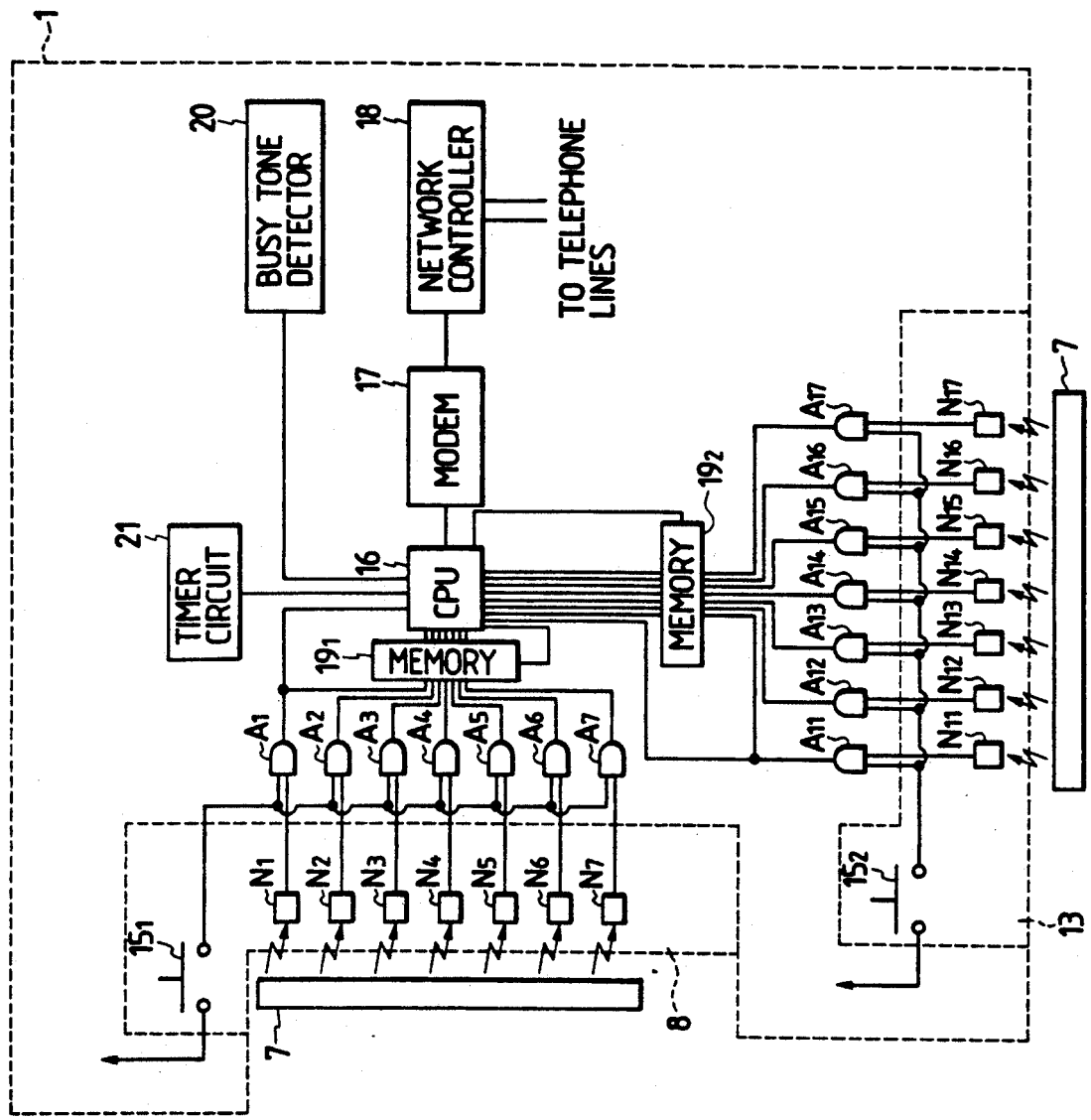
FIG. 17 shows a control circuit for actuating a communication means according to a detection switch which is incorporated in the system shown in FIG. 1 and relates to the fifth embodiment of the invention.

In a control circuit shown in FIG. 17, to AND gates $A_1$ to $A_7$ and $A_{11}$ to $A_{17}$ are inputted signals from detection switches $15_1$ and $15_2$, and light receiving elements $N_1$ to $N_7$, and $N_{11}$ to $N_{17}$. This is the only difference from the control circuit shown in FIG. 12. To a CPU 16 is inputted signals outputted from AND gates $A_1$ and $A_{11}$. The signals outputted from the AND gates $A_1$ to $A_7$, and $A_{11}$ to $A_{17}$, are applied to the CPU 16 via memory circuits $19_1$ and $19_2$. Here, 21 is a timer circuit, and 20, a busy tone detection circuit.

Figures 18, 18A:
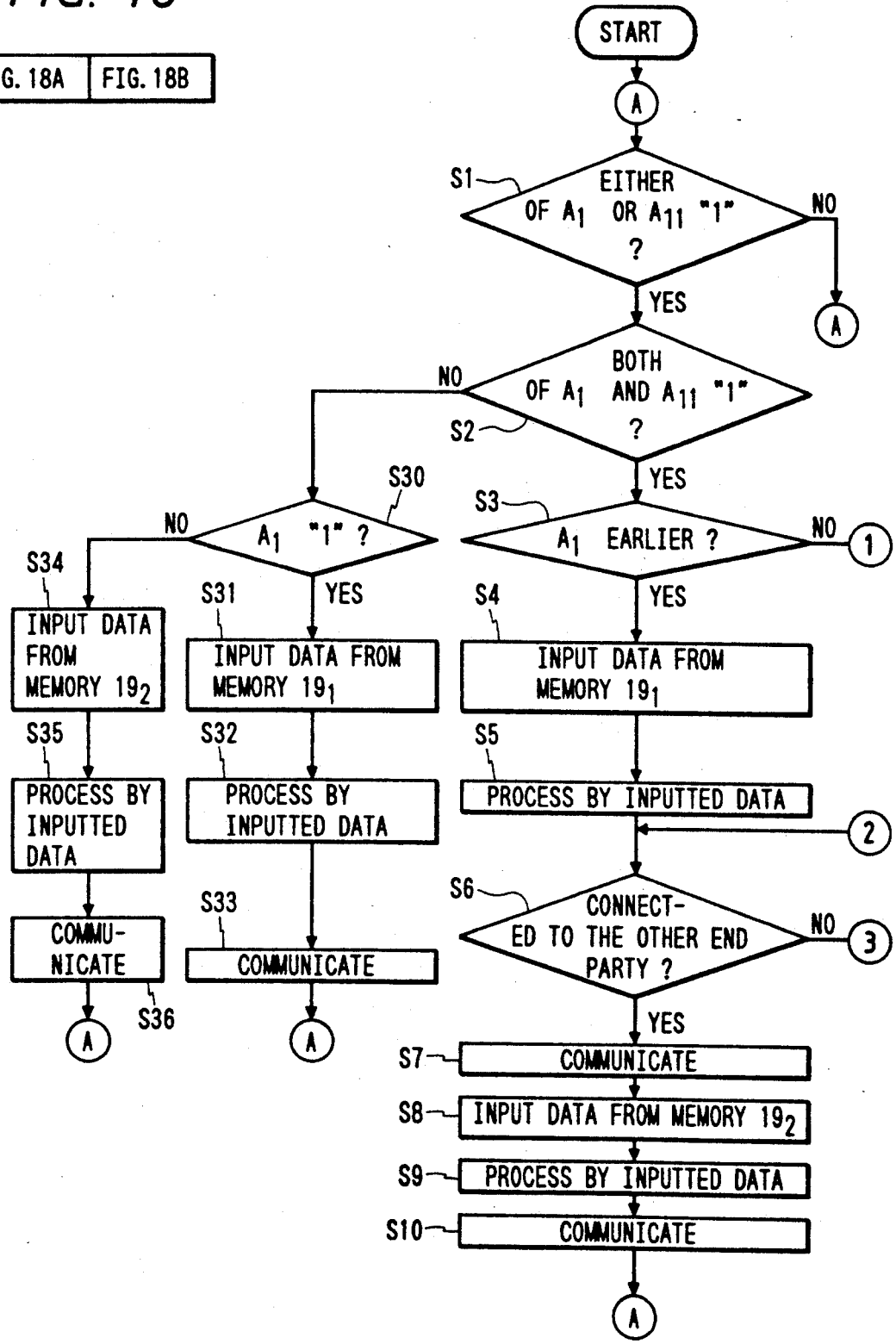
FIG. 18, consisting of FIGS. 18A and 18B, is a flowchart of operations of the circuit shown in FIG. 17.
Figure 18B:
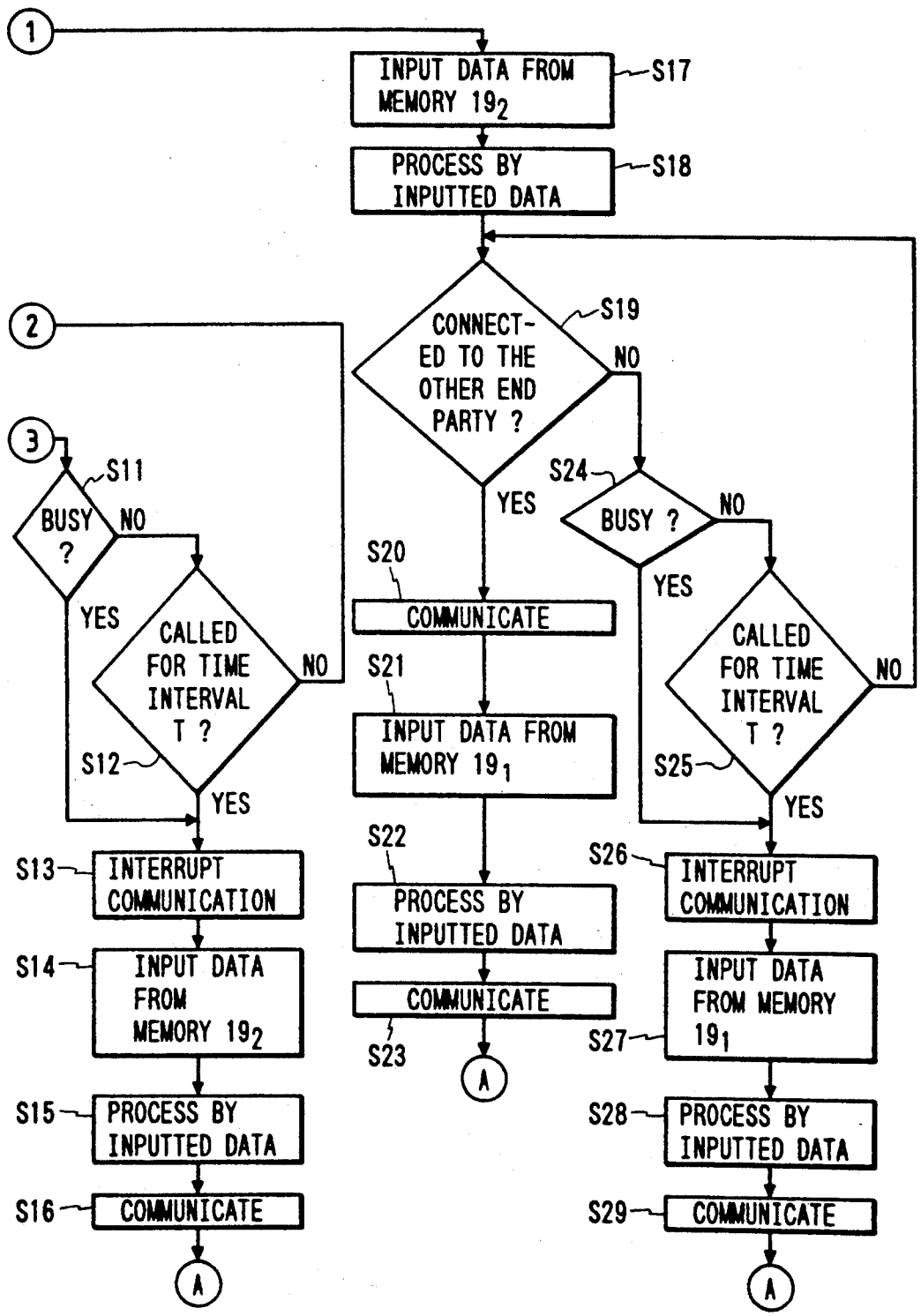

The operations of the facsimile system having the aforesaid configuration are described in conjunction with a flowchart shown in FIG. 18.

When cards 7 are mounted in first and second mounting portions 8 and 13, detection switches $15_1$ and $15_2$ in the respective mounting portions turn ON. One input of each of $A_1$ to $A_7$, and $A_{11}$ to $A_{17}$ in the first and second mounting portions 8 and 13 is set to 1.

Assume that an operator presses a start key on the card 7 in the first mounting portion, but does not press a start key on the card 7 mounted in the second mounting portion 13. The card 7 in the first mounting portion 8 causes a light emitting element $L_1$ to emit light. When a light receiving element $N_1$ receives the light, the output of an AND gate $A_1$ becomes 1. Since the card 7 in the second mounting portion does not cause a light emitting element $L_1$ to emit light, the output of an AND gate $A_{11}$ remains 0. Therefore, a CPU 16 determines at a step S1 that either of the AND gates $A_1$ or $A_{11}$ is set to 1, and then proceeds to a step S2. At the step S2, if the CPU 16 determines that only one output of the AND gate $A_1$ and $A_{11}$ is 1, it proceeds to a step S30. At the step S30, if the CPU 17 determines that the output of the AND gate $A_1$ is 1, it enables the memory $19_1$ in the first mounting portion 8 to output but inhibits a memory $19_2$ in the second mounting portion from outputting.

Then, light emitting elements $L_1$ to $L_7$ on the card 7 mounted in the first mounting portion 8 emit light with information of a telephone number. Thereby, light receiving elements $N_1$ to $N_7$ in the first mounting portion 8 detect the light. The outputs of the light receiving elements $N_1$ to $N_7$ which have detected the light are stored in memory $19_1$ via the AND gates $A_1$ to $A_7$. The stored contents are transferred to the CPU 16 instantaneously at a step S31. At a step S32, the CPU 16 makes a call via the modem 17 and the network controller 18 to perform processing based on the input data. At a step S33, a communication is performed. After the communication, the CPU 16 puts the memory $19_1$ in the first mounting portion which has been in an output enable state into an output disable state.

Assume that an operator presses the start key on the card 7 mounted in the second mounting portion 13, but does not press the start key on the card 7 mounted in the first mounting portion. The execution sequence before a step S30 is identical to that mentioned previously, and thereof not described here. At the step S30, if the CPU 16 determines that the output of an AND gate $A_{11}$ is 1, then it enables the memory $19_2$ in the second mounting portion 13 to output but inhibits the memory $19_1$ in the first mounting portion 8 from outputting. Thereby, the data contained in the data memory card 7 in the second mounting portion which is stored in memory $19_2$ is transferred to the CPU 16 instantaneously at a step S34. The CPU 16 makes a call via the modem 17 and the network controller 18 to perform processing based on the input data at a step S35, and then performs a communication at a step S36.

Assuming that start keys on cards 7 mounted in first and second mounting portions 8 and 13 are pressed in that order, communications with both the mounting portions are performed sequentially. When the CPU 16 makes a call based on the data contained in the card 7 which is operated earlier, if a called party is absent and does not answer the call, the call is cancelled. Then, the CPU 16 makes another call using the data contained in the card which is operated later.

Specifically, when start keys on cards 7 mounted in first and second mounting portions 8 and 13 are pressed sequentially, the cards 7 cause light emitting elements $L_1$ to $L_7$ to emit light. The outputs of AND gates $A_1$ and $A_{11}$ are applied to the CPU 16. Thereby, the CPU 16 determines at step S1 that either of the AND gate $A_1$ or $A_{11}$ is set to 1, and then proceeds to step S2. The CPU 16 determines at the step S2 that both the AND gates $A_1$ and $A_{11}$ are set to 1, and then proceeds to a step S3. Then, the CPU 16 determines at the step S3 which output of the AND gate $A_1$ or $A_{11}$ is provided earlier. If it is determined that the output of the AND gate $A_1$ is provided later, the CPU 16 puts the memory $19_1$ into an output enable state and the memory $19_2$ into an output disable state, and then proceeds to step S4. When light receiving elements $L_1$ to $L_7$ in the card 7 mounted in the first mounting portion 8 emit light with information of a telephone number, light receiving elements $N_1$ to $N_7$ in the first and second mounting portions 8 and 13 detect the light. The outputs of the light receiving elements $N_1$ to $N_7$ which have detected the light are stored in memory $19_1$ via the AND gates $A_1$ to $A_7$. The stored contents are transferred to the CPU 16 instantaneously at the step S4. At step S5, the CPU 16 makes a call via the modem 17 and the network controller 18 to perform processing based on the input data. At step S6, the CPU 16 determines whether a called party answers the call. If the party answers the call, a communication is performed at step S7. When one communication completes, the CPU 16 puts the memory $19_1$ in the first mounting portion 8 which has been in the output enable state into the output disable state, and puts the memory $19_2$ in the second mounting portion 13 to the output enable state. Then, the data contained in the data memory card 7 in the second mounting portion which is stored in memory $19_2$ is transferred to the CPU 16 instantaneously at step S8. At step S9, the CPU 16 makes another call via the modem and network controller 18 to perform processing based on the input data. Then, a communication is performed at step S10.

If it is determined at the step S6 that the called party does not answer the call, it is determined whether the line is busy at step S11. Using a busy tone detection circuit 20, if the line is busy, the call is canceled. The communication is interrupted at step S13. If it is determined at the step S11 that the line is not busy, the calling is continued for a duration of time T at step S12. If the called party answers the call during the time T set with the timer circuit 21, it is determined at step S6 that the party has answered. The operations described above are performed. However, if the party does not answer the call when the time T set with the timer circuit 21 has elapsed, the call is canceled and the communication is interrupted at step S13. When the line is busy at the step S11, the CPU 16 puts the memory $19_1$ which has been in the output enable state into the output disable state, and puts the memory $19_2$ into the output enable state. Then, the data contained in the data memory card 7 in the second mounting portion 13 which is stored in the memory $19_2$ is transferred to the CPU 16 instantaneously. At step S15, the CPU 16 makes a call via the modem 17 and network controller 18 to perform processing based on the input data. Then, a communication is performed at step S16.

Assume that start keys on cards 7 in second and first mounting portions 13 and 8 are pressed in that order, the data contained in the cards 7 in the second and first mounting portions 13 and 8 are transmitted sequentially. The execution sequence before step S3 is identical to that described previously, and therefore not described here.

When the CPU 16 determines at step S3 that the output of the AND gate $A_1$ is not earlier, the CPU 16 puts the memory $19_2$ into the output enable state and the memory $19_1$ into the output disable state, and then proceeds to step S17. Thereby, the data contained in the data memory card in the second mounting portion 13 which is stored in the memory $19_2$ is transferred to the CPU 16 instantaneously at the step S17. At step S18, the CPU 16 makes a call via the modem 17 and the network controller 18 to perform processing based on the input data.

Then, it is determined whether a called party answers. If the party answers, a communication is performed at step S20. When one communication completes, the CPU 17 puts the memory $19_2$ in the second mounting portion 13 which has been in the output enable state into the output disable state, and puts the memory $19_1$ in the first mounting portion 8 into the output enable state. Then, at step S21, the data contained in the data memory card 7 in the first mounting portion 8 which is stored in the memory $19_1$ is transferred to the CPU 16 instantaneously. At step S22, the CPU 16 makes a call via the modem 17 and network controller 18 to perform processing based on the input data.

If it is determined at the step S19 that the called party does not answer, it is determined at step S24 whether the line is busy. Using the busy tone detection circuit 20, if the line is busy, the call is canceled. Then, the communication is interrupted at step S26. If it is determined at the step S24 that the line is not busy, the calling is continued for a duration of time T at step S25. If the called party answers during the time T set with the timer circuit, it is determined at step S19 that the party has answered. Then, the operations described above are performed. However, if the party does not answer when the time T set with the timer circuit 21 has elapsed, the call is canceled. Then, the communication is interrupted at step S26. If it is determined at the step S24 that the line is busy, the CPU 16 puts the memory $19_2$ which has been in the output enable state into the output disable state, and puts the memory $19_1$ in the first mounting portion 8 into the output enable state. Then, the data contained in the data memory card 7 in the first mounting portion 8 which is stored in the memory $19_1$ is transferred to the CPU 16 instantaneously at step S27. At step S28, the CPU 16 makes a call via the modem 17 and network controller 18 to perform processing based on the input data. Then, a communication is performed at step S29.

As described above, when start keys on cards 7 mounted in first and second mounting portions 8 and 13 are pressed almost simultaneously, the CPU 16 processes the data items in the order that the start keys are pressed. When the CPU 16 makes a call based on the data contained in the card 7 which is operated earlier, if a called party is busy or absent, the call is canceled. Then, the CPU 16 makes another call based on the data contained in the card 7 which is operated later. Thus, when the party is absent or busy, another telephone call can be made efficiently.

In the aforesaid embodiment, a facsimile system has two card mounting portions. For a facsimile system having three or more card mounting portions, when a plurality of cards 7 among those mounted are operated, the data items sent from the respective communication means are sequentially processed. Thus, all data items contained in the cards 7 are processed duly.

In the aforesaid embodiment, memories $19_1$ and $19_2$ are provided in one-to-one correspondence with first and second mounting portions 8 and 13. There may be only, a single memory and different data storage areas may be allocated in the memory, so that data items sent from two card mounting portions may be stored temporarily. Then, a CPU 16 may read the data sequentially from the memory.

The sixth embodiment of the invention is described below. The same components as those for the first embodiment are assigned the same symbols or numerals. The specific description is omitted.

Figure 19:
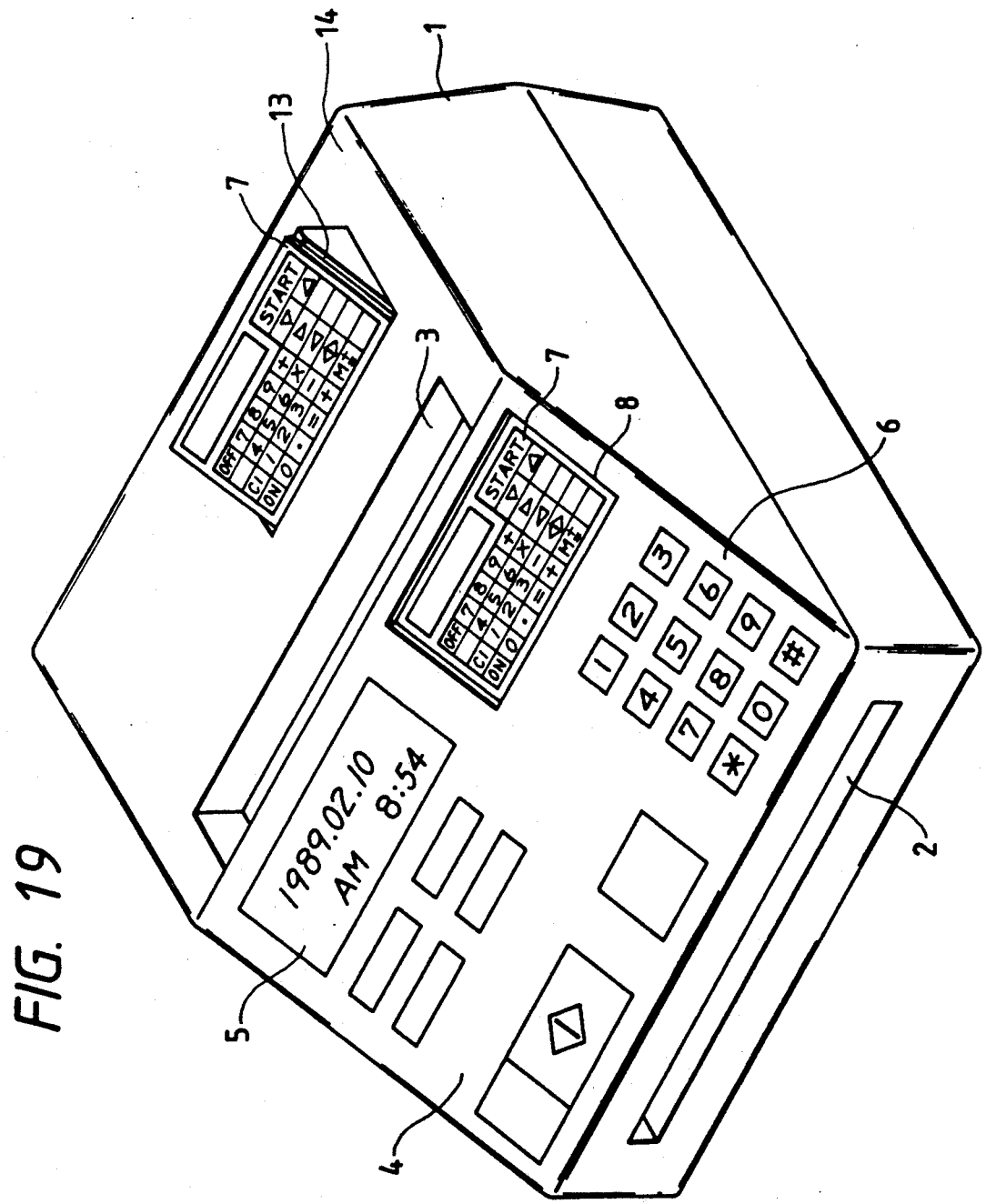
FIG. 19 is a perspective view of an entire system showing the sixth embodiment of the invention.
Figure 20:
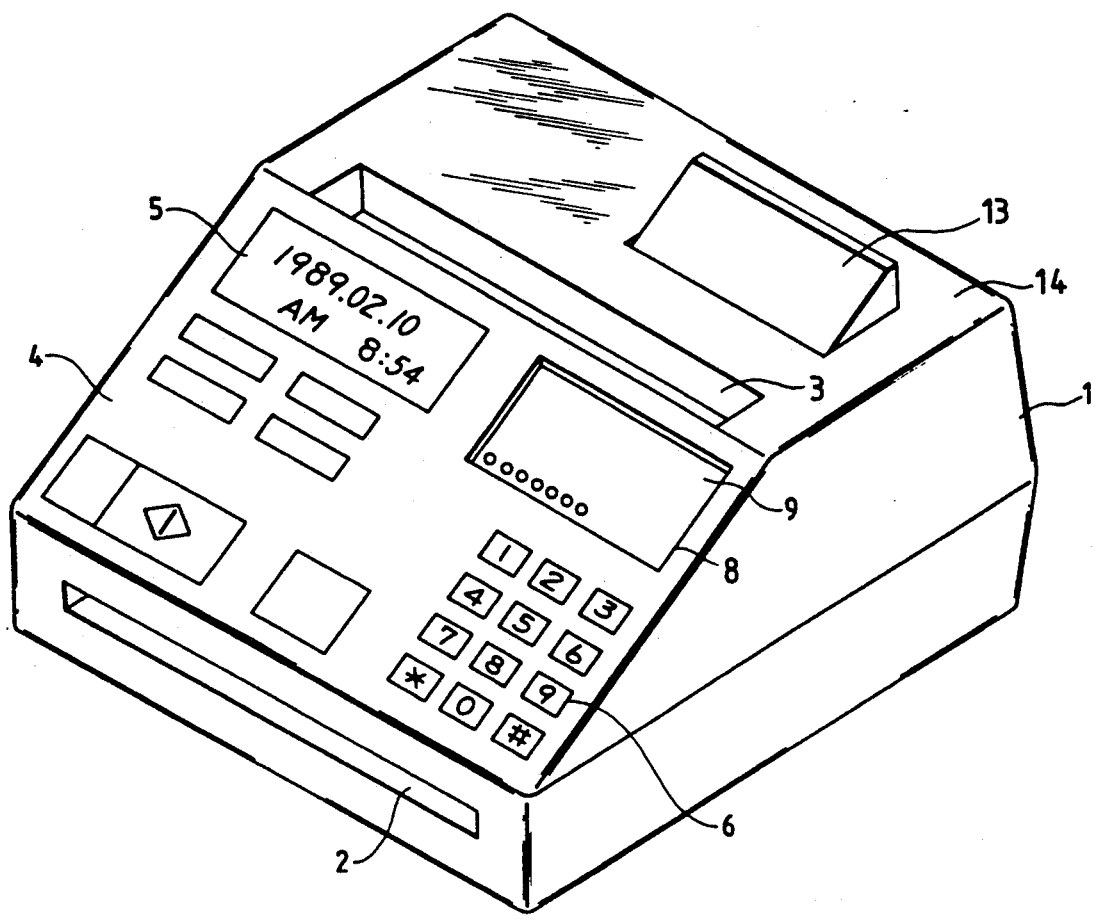
FIG. 20 shows the first mounting portion of the system shown in FIG. 19 with a card dismounted.
Figure 21:
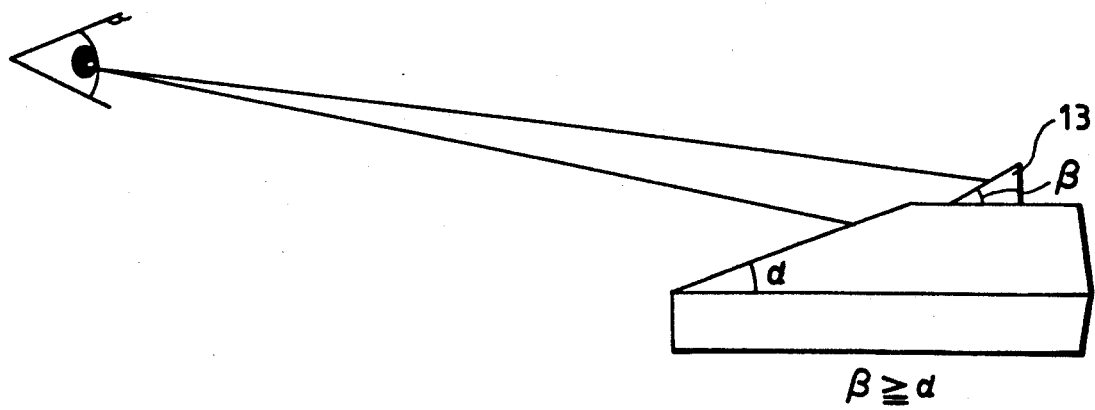
FIG. 21 shows the positional relation between an operator's eye and a data memory card in the system shown in FIG. 19.

FIGS. 19 and 20 show the appearance of a facsimile system with an electronic telephone directory or other data input/output unit. The difference between the system shown in FIGS. 19 and 20 and that shown in FIGS. 1 and 2 underlies a second mounting portion 13. The second mounting portion 13 is inclined with almost the same angle as that of an operator panel 4 so that it may be easily visible to an operator. The angulation of the second mounting portion 13 is a bit greater than that of the operator panel 4, so that the second mounting portion 13 and operator panel 4 may look alike to an operator.

Unlike a first mounting portion 8, the second mounting portion 13 is provided with neither a detection switch $15_2$ for a data memory card 7 nor a communication means. The second mounting portion 13 is used as a base for placing a data memory card 7. An operator operates the data memory card 7 with it on the base.

Figure 22:
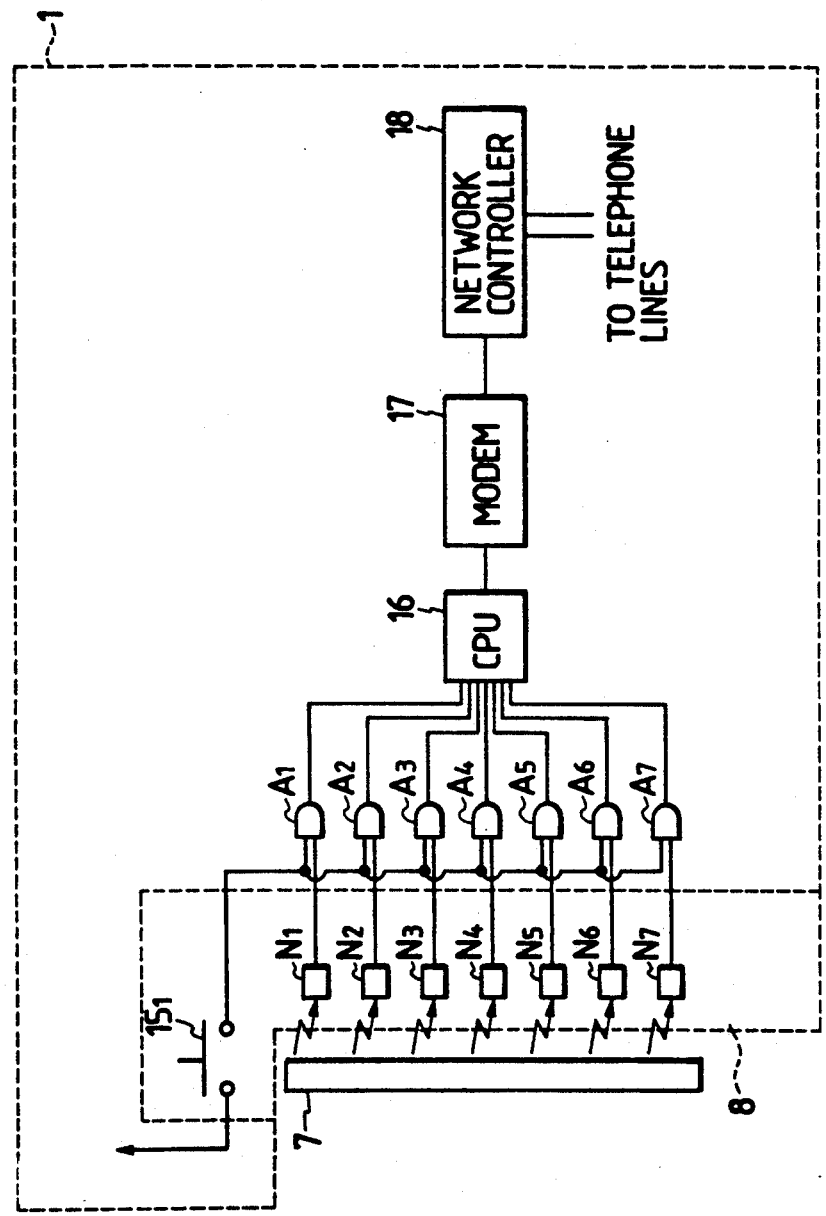
FIG. 22 shows a control circuit for actuating a communication means according to a detection switch which is incorporated in the system shown in FIG. 19.

In a control circuit shown in FIG. 22, the difference from the control circuit shown in FIG. 12 is attributable to the fact that a second mounting portion 13 is provided with no communication means. Therefore, only the outputs of AND gates $A_1$ to $A_7$ are applied to a CPU 16. To the AND gates $A_1$ to $A_7$ are inputted the outputs from a detection switch 15 and light receiving elements $N_1$ to $N_7$.

Next, the operations of the facsimile system having the aforesaid configuration are described.

When a card 7 is mounted in the first mounting portion 8, a detection switch $15_1$ turns ON. The fact that the card 7 has been mounted is detected, and a communication means in the main unit is made active. Specifically, when the switch $15_1$ turns ON, light receiving elements $N_1$ to $N_7$ detect light emitted from light emitting elements $L_1$ to $L_7$. The outputs of the light receiving elements which have detected the light are applied to a CPU 16 via AND gates. The CPU 16 actuates a network controller 18 via a modem 17.

In short, it becomes possible for the CPU to receive signals sent from light receiving elements when a card 7 has been mounted in the mounting portion 8.

The second card 7 is stored in the second mounting portion 13. The card storage is arranged so that it can be easily visible from the operator. Keys on the card 7 can be operated as it is set there. The second mounting portion 13 is formed so that an operator can easily hold one end of the card 7.

When a detection switch $15_1$ is OFF, a communication means in the main unit is inactive. Therefore, even if external light enters light receiving elements in the main unit when no card 7 is mounted in the mounting portion 8, the system does not malfunction.

In this embodiment, two card mounting portions are provided. A facsimile system may have a plurality of mounting portions.

In the embodiments described previously, a third mounting portion may be located at any part within the main unit of the system. For example, the third mounting portion may be arranged on the right part of the system as shown in FIG. 23.

As described previously, according to the invention, a facsimile system has a plurality of mounting portions on which data memory cards acting as electronic telephone directories with data input keys are mounted freely detachably. Therefore, a plurality of cards can be stored in the main unit of the facsimile system. In addition, when the data memory cards are mounted in the plurality of mounting portions, the priorities of communication means are pre-determined to communicate with the cards sequentially. This prevents an incorrect operation resulting from simultaneous communications between multiple cards and the main unit, and helps the main unit to process data items sent from a plurality of cards efficiently. Moreover, the operability is improved.

What is claimed is:
1. A facsimile system, comprising;
   a plurality of mounting portions for detachably mounting thereon data memory cards having data input keys and transmission means for transmitting data, each said card mounting portion having an opening so that said input keys on said card can be operated;

detection means incorporated in each of said plurality of mounting portions which detects whether said card is mounted, said detection means generating a detection signal when detecting a card;

receiving means incorporated in each of said plurality of mounting portions which receives a signal sent from said transmission means; and a control means capable of inputting a detection signal from each of the detection means incorporated in each of said plurality of mounting portions, said control means activating said pre-determined receiving means when a plurality of detection signals are inputted.

2. A facsimile system according to claim 1, wherein said control means activates a receiving means in a mounting portion mounting a card which is operated first when a plurality of detection signals are inputted.

3. A facsimile system according to claim 2, wherein said control means activates a receiving means in a mounting portion mounting a card which is operated first after the card operated first has been removed.

4. A facsimile system according to claim 1, wherein said control means activates a receiving means in a mounting portion to which a card is first mounted when a plurality of detection signals are inputted.

5. A facsimile system according to claim 1, wherein said control means activates a receiving means in a mounting portion located in the front part of the system when a plurality of detection signals are inputted.

6. A facsimile system, comprising;

a plurality of mounting portions for detachably mounting data memory cards having data input keys and transmission means for transmitting data, said card mounting portions each having an opening for operating said input keys on said card;

a detection means incorporated in each of said plurality of mounting portions which detects whether said card is mounted, said detection means generating a detection signal when detecting said card;

a receiving means incorporated in each of said plurality of mounting portions which receives a signal sent from said transmission means;

a control means capable of inputting a detection signal from said detection means incorporated in each of said plurality of mounting portions, said control means activating each receiving means according to the pre-determined order when a plurality of detection signals are inputted; and a processing means for processing data sent from each receiving means sequentially when said control means activates each receiving means according to the predetermined order.

7. A facsimile system according to claim 6, wherein when said control means determines that said processing means continues to call after a predetermined time has elapsed, said control means activates the receiving means in a mounting portion given a next priority instead of a receiving means currently active and allows said processing means to process data sent from said receiving means.

8. A facsimile system, comprising:

a plurality of mounting portions for detachably mounting data memory cards having data input keys and transmission means for transmitting data, said card mounting portion each having an opening for operating said input keys on said card;

a detection means incorporated in each of said plurality of mounting portions which detects whether said card is mounted;

said detection means generating a detection signal when detecting said card;

a receiving means incorporated in each of said plurality of mounting portions which receives a signal sent from said transmission means; and a control means capable of inputting a detection signal sent from each detection means incorporated in each of said plurality of mounting portions, said control means activating one of said plurality of mounting portions when a detection signal is inputted from the detection means in said mounting portion and inactivating receiving means in other mounting portions.

9. A facsimile system, comprising:

a first mounting portion for detachably mounting a data memory card having data input keys and a transmission means for transmitting data, said card mounting portion having an opening so that said input keys on said card can be operated;

detection means incorporated in said first mounting portion which detects whether said card mounted, said detection means generating a detection signal when detecting said card;

a receiving means incorporated in said first mounting portion which receives a signal sent from said transmission means;

a control means capable of inputting a detection signal sent from said detection means incorporated in said first mounting portion, said control means activating a receiving means when a detection signal is input; and another mounting portion for detachably mounting a data memory card having data input keys and transmission means for transmitting data, said other mounting portion having an opening for operating input keys on said card and, said other mounting portion having neither detection means nor receiving means, unlike said first mounting portion.

10. A facsimile system according to claim 9; wherein other mounting portion is arranged in the same manner as said mounting portion for the eyes of an operator.

* * * * *

UNITED STATES PATENT AND TRADEMARK OFFICE
CERTIFICATE OF CORRECTION

PATENT NO. : 5,204,758
DATED : April 20, 1993
INVENTOR(S) : TAKAHIRO SAKAMOTO

Page 1 of 2

It is certified that error appears in the above-identified patent and that said Letters Patent is hereby corrected as shown below:

COLUMN 1

Line 18, "is tend" should read --tends--.
Line 50, "Card" should read --A card--.

COLUMN 2

Line 10, "excepts" should read --except--.

COLUMN 4

Line 34, "diods" should read --diodes--.

COLUMN 7

Line 16, "elements $l_1$" should read --elements $L_1$--.

COLUMN 10

Line 34, "mounting" should read --mounted--.
Line 37, "thereof" should read --therefore is--.

COLUMN 11

Line 31, "thereof" should read --therefore is.
Line 64, "cate" should read --cate.--.

COLUMN 12

Line 12, "locations" should read --location--.

UNITED STATES PATENT AND TRADEMARK OFFICE
CERTIFICATE OF CORRECTION

PATENT NO. : 5,204,758
DATED : April 20, 1993
INVENTOR(S) : TAKAHIRO SAKAMOTO

It is certified that error appears in the above-identified patent and that said Letters Patent is hereby corrected as shown below:

COLUMN 13

Line 19, "thereof" should read --therefore is--.

COLUMN 16

Line 65, "comprising;" should read --comprising:--.

COLUMN 17

Line 33, "comprising;" should read --comprising:--.

COLUMN 18

Line 35, "detection" should read --a detection--.
Line 36, "mounted," should read --is mounted,--.
Line 54, "claim 9;" should read --claim 9,--.

Signed and Sealed this

Fifteenth Day of March, 1994

*Attest:*

BRUCE LEHMAN

*Attesting Officer*  *Commissioner of Patents and Trademarks*